United States Patent
Russell

(10) Patent No.: US 7,431,351 B2
(45) Date of Patent: *Oct. 7, 2008

(54) PRESSURE-CONTAINING TUBULAR CONNECTIONS FOR REMOTE OPERATION

(76) Inventor: Larry R. Russell, 3607 Grammercy, Houston, TX (US) 77025

( * ) Notice: Subject to any disclaimer, the term of this patent is extended or adjusted under 35 U.S.C. 154(b) by 245 days.

This patent is subject to a terminal disclaimer.

(21) Appl. No.: 10/869,268

(22) Filed: Jun. 16, 2004

(65) Prior Publication Data

US 2004/0245779 A1 Dec. 9, 2004

Related U.S. Application Data

(63) Continuation-in-part of application No. 10/133,093, filed on Apr. 26, 2002, now Pat. No. 6,764,110.

(51) Int. Cl.
F16B 4/00 (2006.01)
F16L 35/00 (2006.01)

(52) U.S. Cl. ............. 285/381.1; 285/334.1; 285/334.2; 285/360; 285/391; 285/401; 285/920

(58) Field of Classification Search ................ 285/391, 285/401, 920, 360, 381.1, 334.1, 334.2
See application file for complete search history.

(56) References Cited

U.S. PATENT DOCUMENTS

| | | | |
|---|---|---|---|
| 1,831,956 A | 11/1931 | Harrington | 285/18 |
| 2,984,899 A | 5/1961 | Richter et al. | 29/447 |
| 3,063,143 A | 11/1962 | Bodine | 29/447 |
| 3,948,545 A | 4/1976 | Bond | 285/391 |
| 4,124,232 A | 11/1978 | Ahlstone | 285/18 |
| 4,185,856 A | 1/1980 | McCaskill | 285/18 |
| 4,330,140 A | 5/1982 | Hampton | 285/391 |
| 4,798,404 A * | 1/1989 | Iyanicki | 285/12 |
| 5,433,490 A | 7/1995 | Hurd et al. | 285/360 |
| 5,441,310 A | 8/1995 | Barrett et al. | 285/18 |
| 6,764,110 B2 * | 7/2004 | Russell | 285/381.1 |

* cited by examiner

*Primary Examiner*—James M Hewitt
*Assistant Examiner*—Jay R Ripley
(74) *Attorney, Agent, or Firm*—Elizabeth R. Hall

(57) ABSTRACT

This invention is a method and apparatus for making a pressure-containing threaded tubular connection, suitable for remotely operated connection and separation, utilizing electrical heating to reduce the amount of make up torque required to produce reliable preloading of the connection. One aspect of the present invention comprises: 1) a first hub with male threads on its exterior and having a sealing face and axial flow passage, b) a second hub having an axial flow passage and carrying an annular seal which can be mated with the sealing face of the first hub and mounting a rotatable nut having female threads on its interior and integral nut heating means. After stabbing and initial make-up of the connection, the nut is heated and thereby expanded in a controlled manner and the connection retightened. Following cooling, the structural connection is fully preloaded and the annular seal fully compressed so that it seals. Reversing the procedure permits disconnection.

27 Claims, 24 Drawing Sheets

PRESSURE-CONTAINING TUBULAR CONNECTIONS FOR REMOTE OPERATION

CROSS REFERENCE TO RELATED APPLICATIONS

The present application is a continuation-in-part application of patent application Ser. No. 10/133,093 filed Apr. 26, 2002 now U.S. Pat. No. 6,764,110, and entitled "Remotely Pretensioned Threaded Tubular Connections" invented by Larry R. Russell.

BACKGROUND OF THE INVENTION

1. Field of the Invention

The present invention relates in general to a method and apparatus for securing pressure-containing threaded tubular connections in remote or hazardous locations. More particularly, the invention relates to a method and apparatus for using electrical heating to remotely pretension pressure containing threaded tubular connections.

2. Description of the Related Art

Tubular connections for containing high pressure are widely used by industry, and a very large number of different types have been developed for specific needs. Several types based upon threaded connections are used frequently in oilfield applications. One very common type of connection used for pipes has tapered threads and relies upon interference between the male and female threads when the connection halves are screwed together. The National Pipe Thread (NPT) commonly used in the United States belongs to this first type of connection. This type of connection requires high make up and break out torques and liberal lubrication for even small sizes.

A second type of threaded connection utilizes the interference fit of a transverse sealing shoulder on each side of the connection where the annular shoulders are forced together as the threads are made up. This second type of connection can use either integral threads so that the sealing shoulders must be rotated relative to each other or a nut on one side can be used to avoid relative rotation of the sealing shoulders. Standard American Petroleum Institute (API) drill pipe threads are a typical example of a relatively rotating seal of this second type of connection. For large sizes, very high make up torques and ample lubrication are required. This type of connection can be modified to use an annular face seal in a groove in one of the comating sealing shoulders either as the only seal or as a secondary seal. Certain types of seals such as elastomers or metal C-rings or metal O-rings do not require high compression loads to achieve sealing, but high interfacial preloads may be needed in order to resist high tensile or bending loadings transferred across the connection. Another type of modification for this type of seal uses an intermediate annular seal washer compressed between the two transverse sealing faces.

A third type of connection is similar to the second, but uses the interference fit of comating conical faces to achieve sealing. Again, the connection can have either relative rotation or no relative rotation. This type of connection is frequently used in oilfield tubing and casing. The torques to achieve sealing are somewhat reduced, but the hoop stresses adjacent the comating conical surfaces must be controlled by limiting the interference fit. Again, the torques are only somewhat reduced and good lubrication is still required.

A fourth type of screwed connection uses a seal ring in an annular groove on a cylindrical surface of a first connection half to achieve radial sealing between the grooved part and a comating cylindrical surface on the second connection half. The seal can be elastomeric, such as an O-ring or a C-ring, or the seal can be a metal O-ring or some other metal-to-metal seal. This type of connection does not require much lubrication or high make up torques unless high loadings must be resisted across the connection. The seal for this type of connection can be either rotating or nonrotating relative to its comating surface.

Another type of connection uses flanges having multiple bolts or studs and nuts in a bolt circle pattern to pull the two sides of the connection together and achieve sealing. API or ANSI flanges are examples of this type of connection. Either annular face seals with or without intermediate gaskets or annular wedging interference fit seals such as conical faced ring gaskets are typically used. Lubrication is not as severe a problem as for the first, second, and third connection types. However, even though the torques required to make up or break out the fasteners are less than those for a single thread pair joint, they can still be substantial. Furthermore, unpredictable variations in friction make obtaining uniform bolting preloads unlikely, thereby impairing joint reliability.

The basic problem with all existing types of connections when used to transmit high axial and bending loadings or to seal high pressures is the need to accurately control the make up torque and friction of the threads so that a predictable value of joint preload can be obtained. This is essential, even for cases where the seal does not require high preload, so that the connection can resist bending moments and the threads of any connections are not subject to large magnitude load cycling with attendant metal fatigue. Unfortunately, such predictability is very hard to obtain, and the predictability becomes much less when the connections are remotely made in a difficult environment, such as subsea. When the connection must be repeatedly made up and broken out remotely, joint torque predictability and, hence, connection and seal reliability become very problematic. For such situations, thread galling, seal damage, misalignment, and the need for very high torques further complicate the problem.

What is urgently needed is a new type of high pressure, high load connection which can be made up and broken out repeatedly without significant risk of failure and without the need for very high torques. Avoidance of seal damage, thread damage, alignment problems, reduced sensitivity to lubrication problems, and general improvements in reliability are strongly needed. Improvements in connection behavior predictability will result if these needs are met. These requirements become particularly critical for remote connections where general robustness of the connection is essential and the connection must be adaptable to widely varying and difficult installation conditions with only limited informational feedback to the installer.

SUMMARY OF THE INVENTION

The invention contemplates a simple, inexpensive device for solving the problems and disadvantages of the prior approaches discussed above. The present invention provides a rapid, reliable and accurate pretensioning of threaded tubular connections in remote locations. The invention is a method and apparatus for making a pressure-containing threaded tubular connection suitable for remotely operated connection and separation. The connector of the present invention utilizes electrical heating to reduce the amount of make up torque required to produce reliable preloading of the connection and a means for biasing against the nut hub to simplify relative axial positioning of the two sides of the connector.

One aspect of the present invention comprises: (1) a first hub having a through bore, an interior end and an external surface, wherein the first hub has a plurality of threads on a portion of the external surface; (2) a second hub having a through bore and a first end; (3) a coupling nut coaxially mounted on the second hub to limit axial movement of the coupling nut along a length of the second hub, wherein the coupling nut has a plurality of internal threads adapted to threadedly engage the threads on the external surface of the first hub, wherein tightening the coupling nut forces the interior end of the first hub towards the first end of the second hub; and (4) heating means for heating the coupling nut; whereby when the coupling nut is heat-expanded less torque is required to tighten or loosen the coupling nut.

Another aspect of the present invention comprises: (1) a first hub having a through bore, a first end and an externally threaded exterior section proximal the first end; (2) a second hub having a through bore, an outer surface, an interior end, and a shoulder opposed to the interior end; (3) a coupling nut having an internally threaded proximal end adapted to threadedly engage the externally threaded exterior section of the first hub, and an internal shoulder distal to the threaded proximal end engaged with the shoulder of the second hub to provide axial and radial position control for said coupling nut, wherein tightening the coupling nut forces the first end of the first hub towards the interior end of the second hub; a heating element attached to said coupling nut; and (4) torquing means for transmitting torque to the coupling nut to tighten or loosen the nut; whereby when the heating element increases the temperature of the coupling nut sufficiently the coupling nut is expanded and less torque is needed to achieve a predetermined pretensioning of the tubular connector.

Still another aspect of the present invention comprises: (1) a first hub having a through bore, an interior end, an external surface, a first conical seal recess between the through bore and the interior end, and a plurality of external interrupted threads on a portion of the external surface; (2) a second hub having a through bore, a first end, a second end, a cylindrical upset external section, an outwardly facing transverse intermediate shoulder, and a conical seal recess; (3) a coupling nut coaxially mounted on the second hub, wherein the coupling nut has a plurality of internal interrupted threads adapted to threadedly engage the threads on the external surface of the first hub, the threads adjacent a first end of the nut and having an inwardly extending transverse shoulder at a second end of the nut, wherein tightening the coupling nut forces the interior end of the first hub towards the first end of the second hub; (4) a keeper ring mounted on the second hub adjacent to the coupling nut to limit axial movement of the coupling nut along a length of the second hub toward the second end of the second hub; (5) at least one nut bias spring positioned between and abutting the interior shoulder of the nut and the outwardly facing shoulder of the second hub, wherein the nut bias spring biases the nut away from the outwardly facing shoulder of the second hub by a predetermined distance D; and (6) an annular seal having a through bore, wherein the seal is mounted on the first end of the second hub and prevents ingress or egress of fluid between the interior end of the first hub and the first end of the second hub when the coupling nut is tightened to sufficiently compress the seal between the interior end of the first hub and the first end of the second hub; whereby when the seal axially abuts the first hub on a first side and the second hub on a second side, an initial rotation of the nut engages the internal threads of the nut with the external threads of the first hub and an additional rotation of the nut overcomes the bias of the nut spring bias to abut the inwardly extending transverse shoulder of the nut against the outwardly facing shoulder of the second hub.

Yet another aspect of the present invention is a method of prestressing a threaded connection comprising the steps of:

(1) selecting a tubular connector to connect two lengths of tubing, the connector comprising: a first hub having a through bore, an interior end and an external surface, wherein the first hub has a plurality of external threads on a portion of the external surface; a second hub having a through bore and a first end; a coupling nut coaxially mounted on the second hub to limit axial movement of the coupling nut along a length of the second hub, wherein the coupling nut has a plurality of internal threads adapted to threadedly engage the threads on the external surface of the first hub, wherein tightening the coupling nut forces the interior end of the first hub towards the first end of the second hub; and a heating element for heating the coupling nut;

(2) aligning the internal threads of the coupling nut for engagement with the external threads of the first hub;

(3) applying an initial torque to the coupling nut to engage the external and internal threads to form a connection between the first hub and the coupling nut with a first level of tension on the connection;

(4) thermally expanding the coupling nut;

(5) applying a secondary torque to the coupling nut to provide a second level of tension on the connection; and (6) allowing the coupling nut to achieve ambient temperature to achieve a third level of tension on the connection.

A further aspect of the present invention comprises: (1) a first hub having a first through bore, a cylindrical counterbore, a first conical mating surface for receiving a seal, a first interior end, and a first external surface, wherein the first hub has a plurality of threads on a portion of the first external surface; (2) a second hub having a second through bore, a second interior end, a conical seal on said second interior end sealingly comatable with the first conical mating surface, a cylindrical stabbing nose extending coaxially from said second interior end, a second outer surface, and a second hub shoulder opposed to the second interior end; (3) a coupling nut having an internally threaded proximal end adapted to threadedly engage the externally threaded first external surface, and an internal nut shoulder distal to the threaded proximal end engaged with the shoulder of the second hub to provide axial and radial position control for said coupling nut, wherein tightening the coupling nut forces the first end of the first hub towards the interior end of the second hub; (4) a heating element attached to the coupling nut; and (4) a torquing means for transmitting torque to the coupling nut to tighten or loosen the nut; whereby when the first and second hubs are brought together in a state of misalignment, interaction of the stabbing nose with the counterbore of the first hub produces coaxial alignment of the first and second hubs and when the heating element increases the temperature of the coupling nut sufficiently the coupling nut is expanded and less torque is needed to achieve a predetermined pretensioning of the tubular connector.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
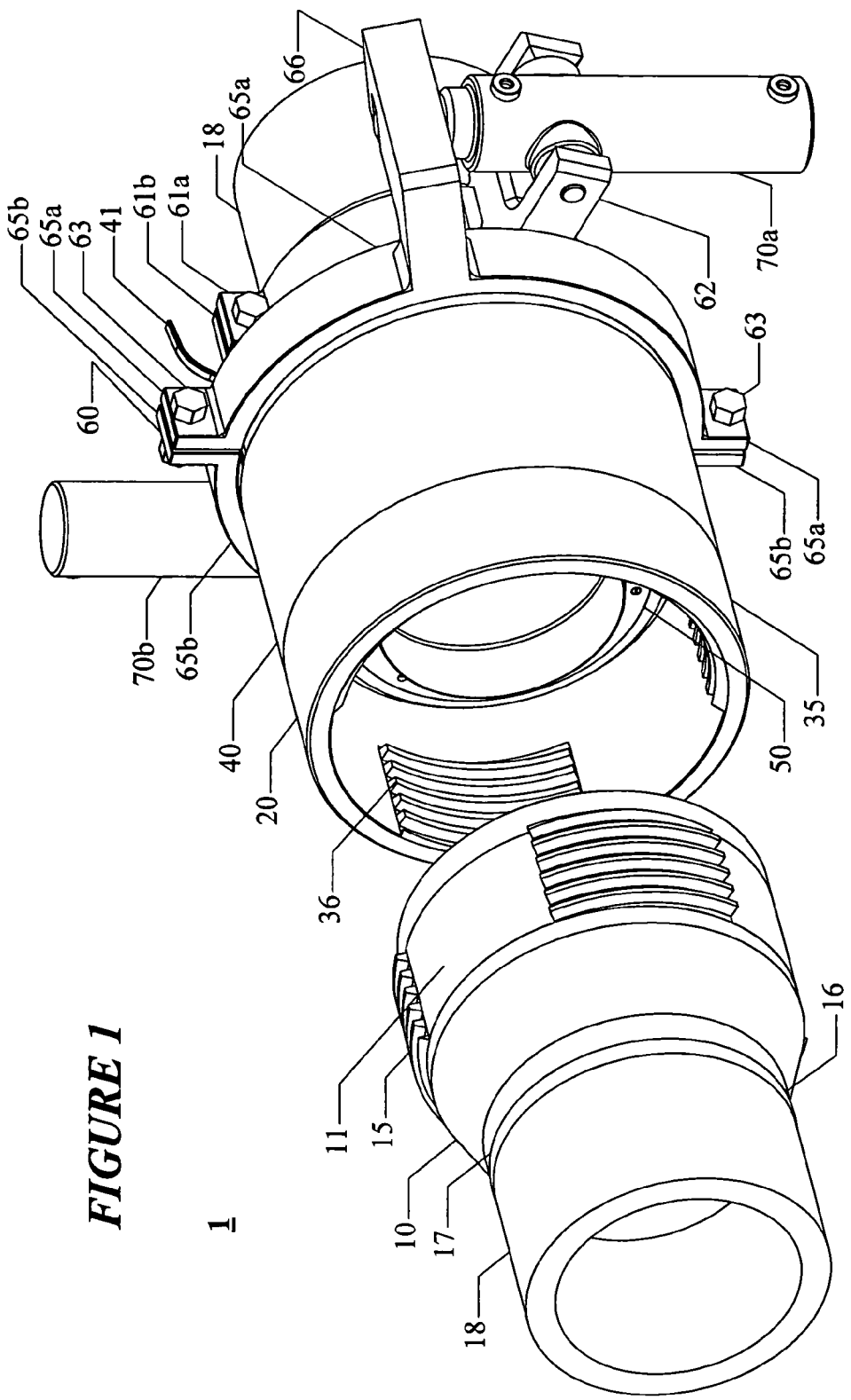
FIG. 1 shows an oblique view of one embodiment of the tubular connector according to the present invention.

The present invention provides a rapid, reliable and accurate process for remotely pretensioning threaded tubular connections in difficult environments and under hazardous conditions. The nut of the tubular connection is preheated to a predetermined temperature above ambient, pretensioned at the increased temperature, and allowed to cool to ambient temperature. Upon cooling, the connection arrives at its desired operational preload. Likewise, the tubular connection is easily disconnected by preheating the nut to a temperature sufficiently above ambient to expand the nut. As the nut expands, the tension on the mated threads of the two hubs is relaxed and the nut is easily loosened. The invention is particularly applicable for use in remote applications, such as subsea, high temperature, hazardous and radiation generating environments.

The connection device of the present invention is shown in different configurations to adapt the connection device for different situations with varying degrees of stabbing misalignment and environmental cleanliness. Four examples, or embodiments, of device configuration are taught in detail. The first embodiment, shown in FIGS. 1-6, is configured for use in conditions where a medium level of misalignment and dirty conditions exist. The second embodiment, FIGS. 7-14, is configured to deal with significant misalignments and dirty conditions. Whereas, the third embodiment, shown in FIGS. 15-18, is % configured for use under conditions with a minor misalignment and relatively clean conditions. Finally, the fourth embodiment shown in FIGS. 19-24 utilizes a coupling nut spring-biased away from its mounting to avoid the need for axial manipulation of the connector during thread make up and is particularly suitable for connections made up robotically.

Although the basic design of the connection device is adaptable for low or high pressure requirements, each of the examples below illustrates the use of a seal to render the connector suitable for high pressure. Each of the embodiments is configured to be useable with very reliable metal-to-metal sealing. For each embodiment, additional reliability is easy to provide by means of adding a redundant metal-to-metal or elastomeric face seal on the transverse mating faces. If desired, the stabbing nose of the second or fourth embodiments can be provided with a seal for circumferential sealing in an annular groove.

Referring now to the drawings and the specific examples described in detail, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

Example 1

The first embodiment of the tubular connector 1 of the present invention is shown in FIGS. 1-6 and FIG. 13A. This embodiment is suitable for applications where the connection axial angular alignment and position for the connection halves are somewhat controlled, as would be the case for vertical make up in a drilling rig.

As seen in FIG. 1, the tubular connector 1 consists of two hubs, a male side 10 and a female side 20. A length of tubing 18 is connected to the male side 10 and a similar piece of tubing 18 is connected to the female side 20. The tubing 18 is connected to the male and female sides by connection means known to those skilled in the art, preferably by welding. When the two hubs are connected, flow proceeds from the tube connected to the male side 10 through the tube connected to the female side 20. Basically the tubular connector 1 connects the two pieces of tubing, by stabbing the upset male pin 11 into the nut 35 and comating the internal female threads 36 of the nut 35 with the male external threads 15 of the upset male pin 11.

Figure 2:
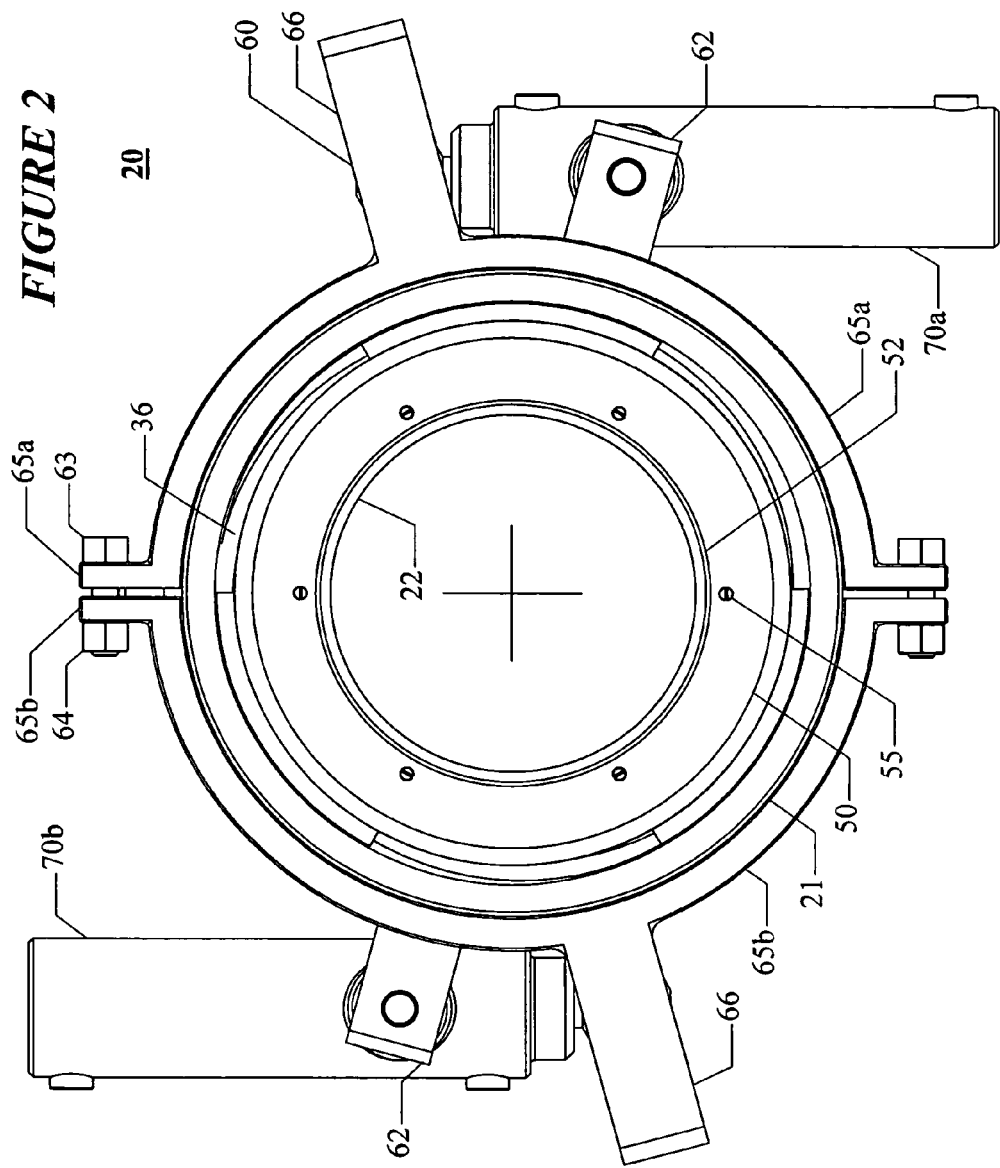
FIG. 2 shows an axial view of the inlet end of the female side of the connector shown in FIG. 1 with the nut in its stabbing but untightened position.
Figure 4:
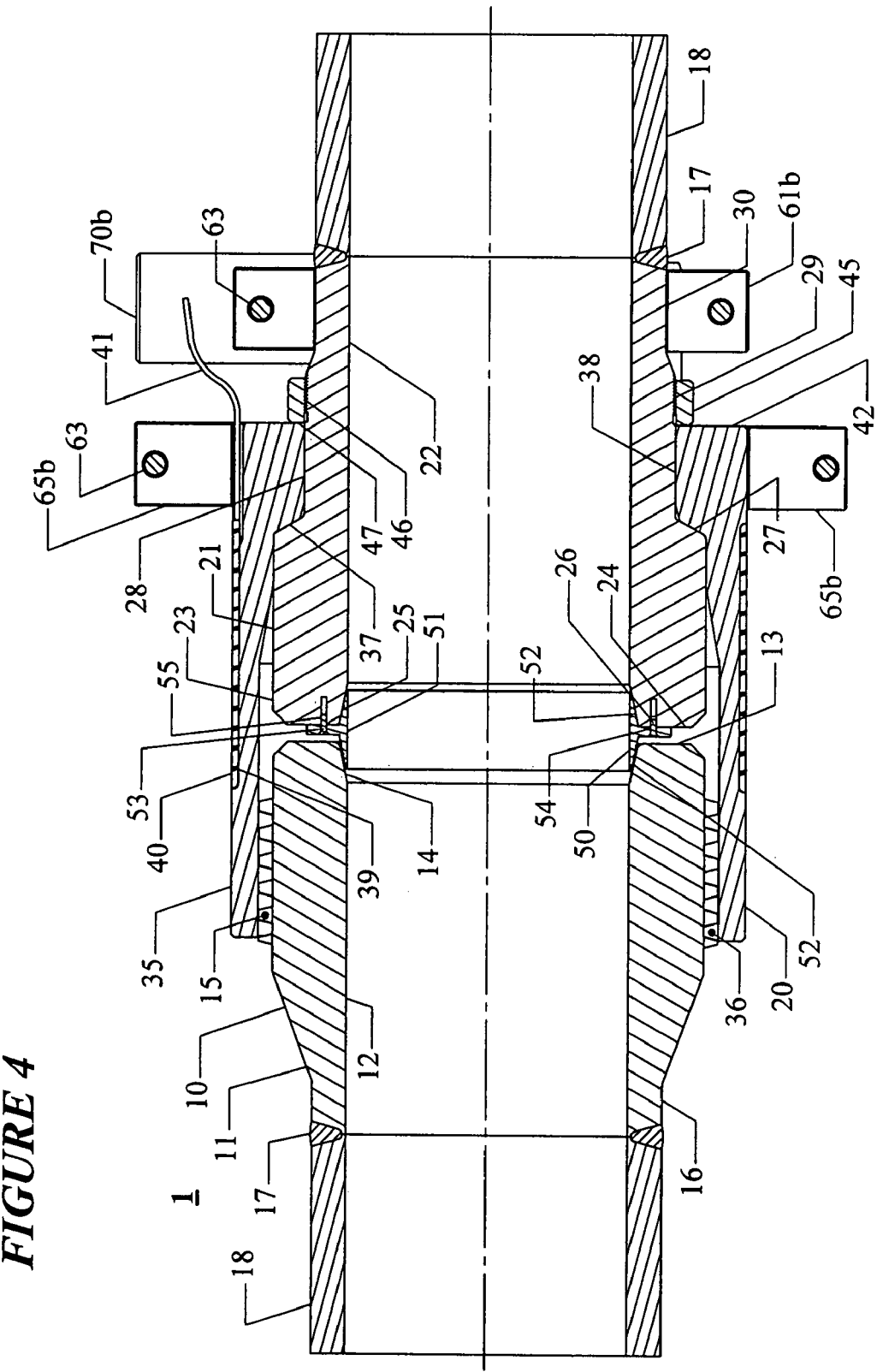
FIG. 4 illustrates a longitudinal sectional view of the stabbed but untightened connector shown in FIG. 1.
Figure 5:
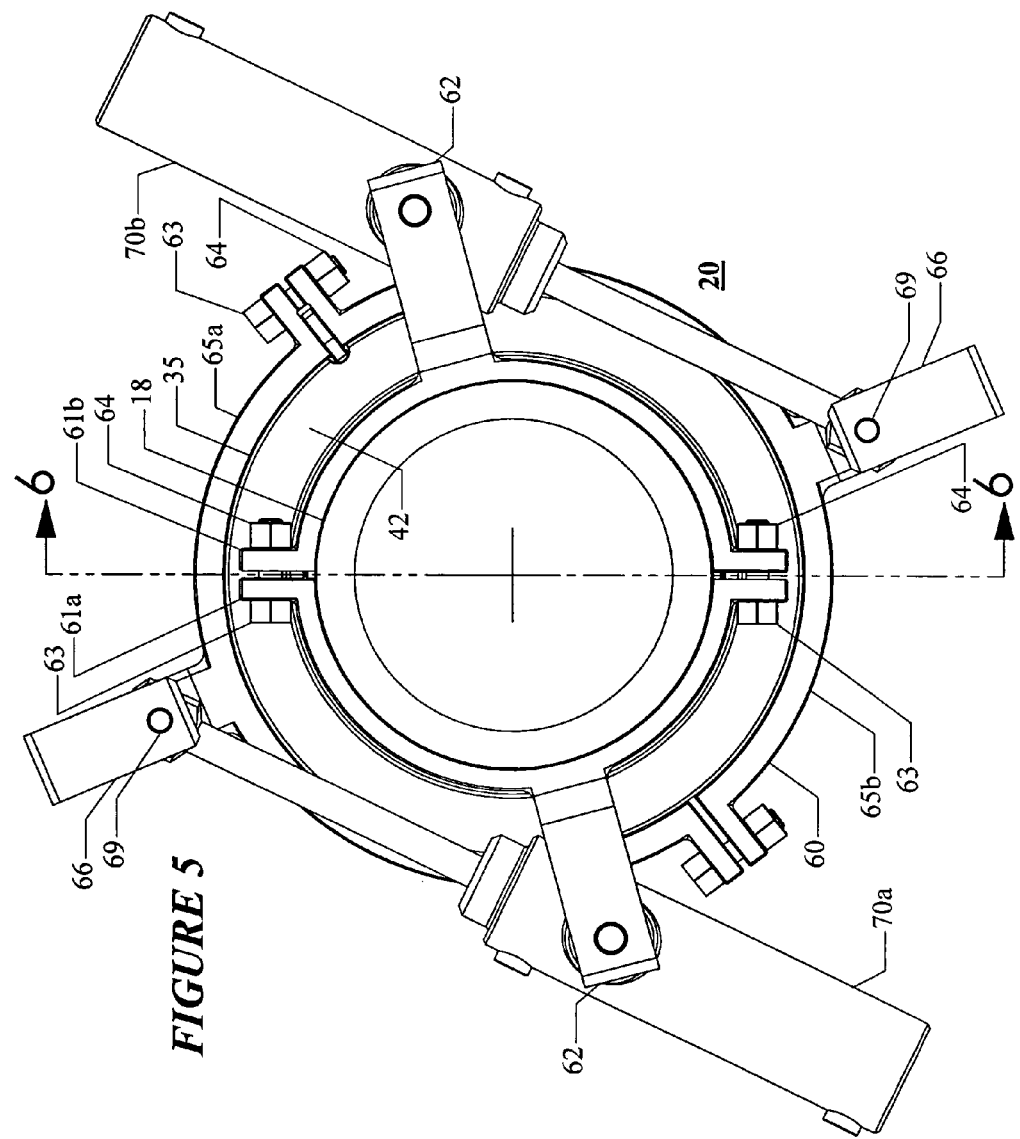
FIG. 5 shows an axial view from the outlet end of the female side of the connector shown in FIG. 1 with the nut in its stabbed and tightened position.
Figure 6:
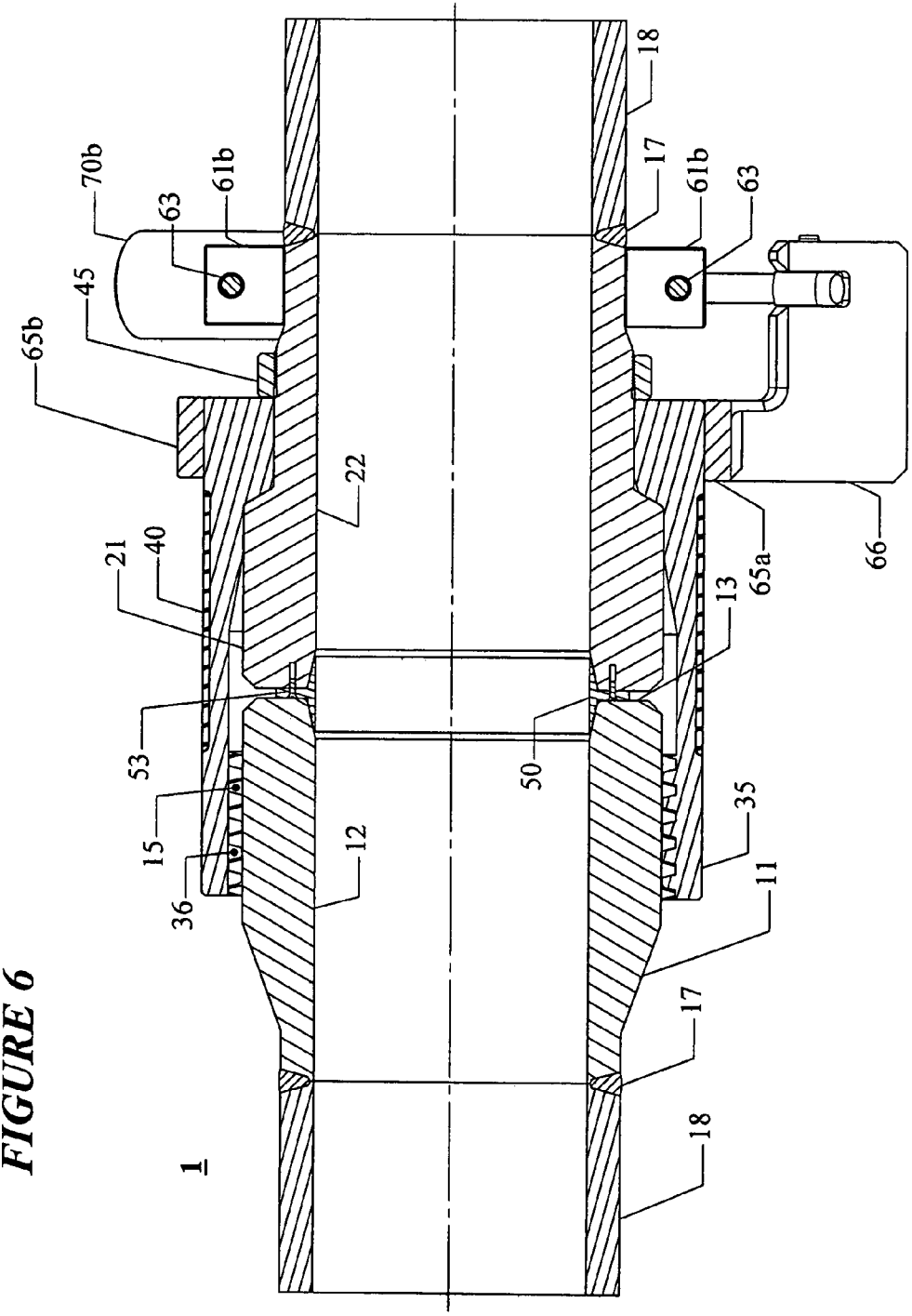
FIG. 6 shows a longitudinal sectional view of the stabbed and tightened connector shown in FIG. 5.

The male side 10, further illustrated in FIGS. 2 and 4, has an externally upset male pin 11 with a through bore 12 and a transverse mating face 13 having conical seal recess 14 formed between bore 12 and face 13. The outside cylindrical surface of pin 11 has male interrupted threads 15. The number of thread starts is equal to the number of thread interrupts. Here, three thread interrupts are used, but another number could be provided. The end of pin 11 obverse to mating face 13 is tapered to a weld neck 16. Circumferential weld 17 joins weld neck 16 to tube 18. Tube 18 is shown as a short segment for purposes of illustration, but typically will be a portion of a pressure containing vessel such as a pipeline.

Figure 3:
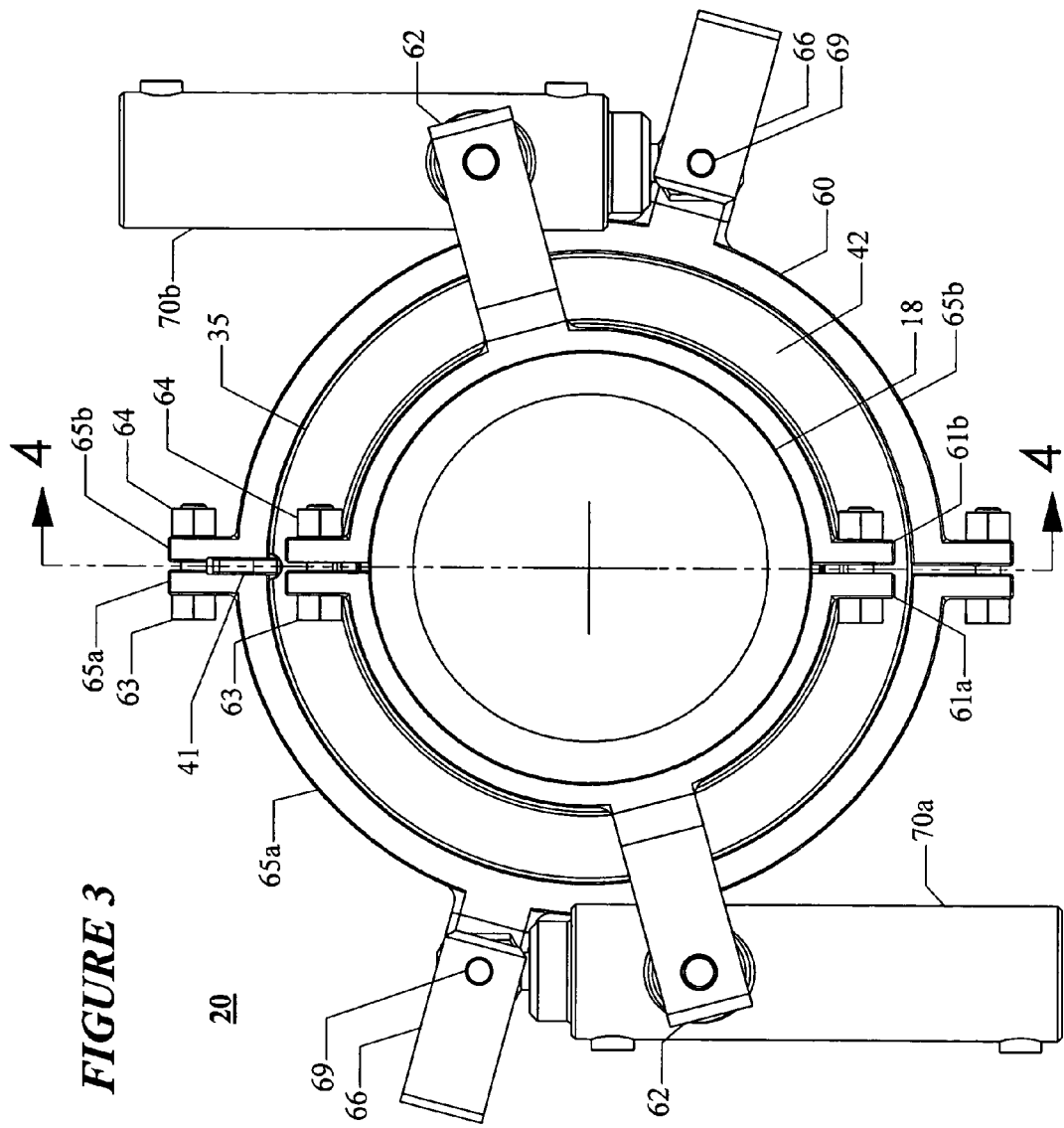
FIG. 3 shows an axial view from the outlet end of the female side of the connector shown in FIG. 1 with the nut in its stabbed but untightened position.

The female side 20, further illustrated in FIGS. 3 and 4, has a nut hub 21 which supports nut 35. Nut hub 21 has a through bore 22, an externally upset cylindrical head 23, and a transverse mating face 24. Conical seal recess 25 is formed at the intersection of bore 22 and transverse face 24 and houses annular seal 50. Multiple drilled and tapped holes 26 permit mounting seal 50 fixedly to face 24 so that seal 50 is integral with nut hub 21. Obverse to mating face 24 and in order of distance from face 24 on the exterior of nut hub 21 is conical abutment shoulder 27 and adjacent cylindrical nut guide surface 28. Adjacent to guide surface 28 is a male thread 29 and weld neck 30. Weld neck 30 is joined by circumferential weld 17 to another connecting tube 18. Note that the sizes of the weld necks and connecting tubes need not be identical for both sides of the connection.

Annular nut 35 has interrupted female threads 36 comatable with the male threads 15 of pin 11 at its outer end. Annular nut 35 has an interior conical shoulder 37 and guide bore 38 at its inner end. Shoulder 37 bears against corresponding shoulder 27 of nut hub 21, while bore 38 mates with guide surface 28 of nut hub 21, thereby controlling axial position and maintaining orientation of the nut 35 relative to nut hub 21. The outside diameter of nut 35 is uniform except for a central annular groove 39 that contains electrical heating element 40. Groove 39 is concentric with the nut axis and contains the heating element 40. The connecting wires 41 of the heating element 40 extend outwardly and are connected to an external power source that is not shown here. The outer end 42 of nut 35 is transverse to the axis of the nut.

Annular keeper ring 45 retains nut 35 on nut hub 21. The bore of the keeper ring 45 has female threads 46 which are screwed together with male thread 29 of nut hub 21 so that transverse shoulder 47 abuts inner end 42 of nut 35 and thereby retains nut 35 on nut hub 21.

Seals can be adapted to sealingly engage the male side 10 and the female side 20. When a seal is provided in the tubular connector 1, the seal prevents the ingress or egress of fluid from the tubing 18 connected by the tubular connector 1. An example of such a seal is shown in FIGS. 4 and 13A. Seal 50 has a bore 51 that is internally flush with the through bores 12 and 22 of pin 11 and nut hub 21, respectively. The equally proportioned external sealing faces 52 of seal 50 are conical with multiple annular grooves axially spaced on the conical surfaces. The annular wall formed between the bore 51 and a conical sealing face 52 is relatively thin, so that the seal is relatively flexible and pressure responsive. The conical surfaces 52 of seal 50 are made to have a fully elastic mild interference fit with the corresponding seat recesses 14 and 25 of pin 11 and nut hub 21, respectively, when fully inserted into a seat recess. Central flange 53 serves as a stop to prevent excessive, permanent distortion of the conical sealing surfaces from overcompression in the seat recesses 14 and 25. Multiple screw holes 54 in flange 53 comate with holes 26 in the nut hub to permit attachment of seal 50 to the nut hub 21 with flathead screws 55. When seal 50 is fully screwed down on transverse mating face 24 of nut hub 21, sealing engagement occurs between conical seal recess 25 of nut hub 21 and a conical sealing face 52 of seal 50. The seal of this first embodiment is substantially similar to the seal used for Graylok™ connectors or the G-Con™ connector offered by the Reflange Company, but with the addition of the grooves and the mounting holes to permit fixing the seal to the nut hub 35. Seal 50 is energized primarily by mechanical compression prestress at its interfaces, but it is additionally pressure energized by the differential across its wall.

A torquing system 60 is provided for engaging or disengaging the threaded nut 35 with the threads 15 of the pin 11. Torquing system 60 comprises of a pair of identical first ring clamp halves 61a,b and a pair of identical second ring clamp halves 65a,b, respectively mounted to the nut hub 21 and the nut 35. Radially projecting from each first ring clamp half 61a,b is a cylinder trunnion mounting bracket 62. The first ring clamp halves 61a,b are bolted together by a pair of bolts 63 and nuts 64 through holes on the radially projecting ears of the ring clamp so that the clamp halves are rigidly fixed to nut hub 21 by friction. If necessary, interlocking keys, welding, or other means can be employed to enhance the torque transmission capabilities of the joint between the clamp halves and the nut hub. Similarly for each second ring clamp half 65a,b, a radially projecting rod pin mount 66 is attached. The second ring clamp halves 65a,b are also connected by a pair of bolts 63 and nuts 64 positioned in holes in radially projecting ears so that they tightly grip the nut 35. Again, welding, keys, or other means may enhance the joint between the second ring clamp halves 65a, b and nut 35.

A pair of identical hydraulic cylinders 70a,b are tangentially mounted to the ring clamps 61a,b and 65a,b. Cylinders 70a,b are each trunnion mounted in a trunnion mounting bracket 62 on the first ring clamp halves 61a,b and have a pin 69 coupling their rod ends to rod pin mount 66 of the second ring clamp halves 65a,b. The cylinders 70a,b are thus positioned so that when their rods are extended, the nut 35 is rotated in a first direction to cause it to tighten, while when their rods are retracted, the nut is rotated in a second opposed direction to cause it to loosen.

The tubular connector 1, described above, is operated in the following manner. Male side 10 and female side 20 are brought into approximate axial alignment as shown in FIG. 1 and then coaxially stabbed together. The connector 1 is able to tolerate mild axial offset and some axial angular misalignment. Although stabbing means are not shown for any of the embodiments described herein, such means are very familiar to those involved with the field of tubular connections. Typically, one side of the connection is held stationary while the other side is caused to axially reciprocate by pipe manipulation, hydraulic cylinders, screw jacks, manual manipulation, or other suitable means. Unless otherwise noted, the hub of the reciprocating side of the connection is also constrained against rotation.

Because interrupted threads 15 and 36 are used, the connection of this first embodiment can be fully stabbed before nut 35 is rotated. This is possible by aligning the nut so that its thread segments will fit into the corresponding gaps of thread 15 during stabbing. In order to initiate rotation, the flange 53 of the seal 50 must be slightly spaced away from the transverse mating face 13 of the male pin 11 so that the female thread 36 can enter the male thread 15. Nut 35 need only rotate a fraction of a revolution to fully engage the interrupted threads of the connection. Typically the relative position of the threads 15 and 36 on, respectively, the pin 11 and the nut 35 is selected to be such that maximum thread engagement is obtained when the connector 1 is fully made up. When the transverse mating faces 13 and 24 are brought into sufficiently close proximity, the projecting conical sealing face 52 of seal 50 engages the conical seal recess 14 to aid in axially centralizing the connection. As the conical sealing face 52 enters the seal recess 14, the grooves aid in screeding trash off the interface, and the multiple annular conical surfaces between the grooves offer redundant seal surfaces.

After the male side 10 and the female side 20 of the connector 1 are substantially stabbed together so that the threads 15 and 36 can be initially engaged, hydraulic pressure is applied to cylinders 70a,b to cause their rods to rotate the nut 35 about nut hub 21 so that the female interrupted threads 36 of nut 35 are caused to engage the male interrupted threads 15 of pin 11. The limited amount of rotation of the nut does not damage the heater connecting wires 41, since they are provided with sufficient slack and are routed away from moving parts that might damage them.

After this initial rotation, the connection is in a state of initial make up. However, due to the limited size and moment arm of the hydraulic cylinders, the axial preload between the flange 53 and seal 50 transverse mating faces 13 and 24 of, respectively, the male 10 and female 20 sides of the connection is insufficient to permit the connection to carry substantial bending moments. Additionally, the threads 15 and 36 will be prone to fatigue damage if not adequately preloaded. Accordingly, electric power is applied to the heating element 40 through connecting wires 41 so that the tensioned tubular section adjacent the heating element 40 between female threads 36 and interior shoulder 37 of nut 35 is heated and thereby expanded. The heating is done until a desired temperature rise and axial extension of the nut 35 is achieved.

Although not shown, it is assumed that the heated portion of the nut 35 is provided with sensor means such as a thermocouple, thermistor or resistance-temperature device for accurately gauging the temperature of the nut so that heating can be stopped at the appropriate time. Typically, the temperature and its associated amount of thermal strain (i.e., extension) are chosen to be equal to approximately the strain which would be produced if the nut were torqued until its axial tension were at a desired fraction (e.g., half) of the yield stress for the nut. After attainment of this desired temperature, the hydraulic cylinders 70a,b are repressured to retorque and tighten the threads 15 and 36, which are loosened when the nut 35 is heated. When the nut is cooled after the electric power to heating element 40 is turned off, the connector 1 will be fully tightened and properly pretensioned so that fatigue is avoided and large bending moments can be transmitted across the connection. Following the cooling and pretensioning of the connection, the connection is also able to hold high pressure fluid flow.

Connector 1 is disconnected by first applying heat to nut 35 with the heating element 40 so the nut reaches the same or a somewhat higher temperature than used in tightening. After the nut is enlarged sufficiently to reduce the friction on the threads 15 and 36, hydraulic pressure is applied to cause cylinders 70a,b to fully retract to thereby fully disconnect the interrupted threads. At that point, the connection can be unstabbed.

Example 2

The second embodiment of the pressure containing tubular connection of this invention and its components are shown in FIGS. 7-14. This embodiment is particularly suited for situations when the connection axial angular alignment and relative position are poorly controlled during stabbing. A typical application for this connection would be a remotely made subsea pipeline pull-in connection.

Figure 7:
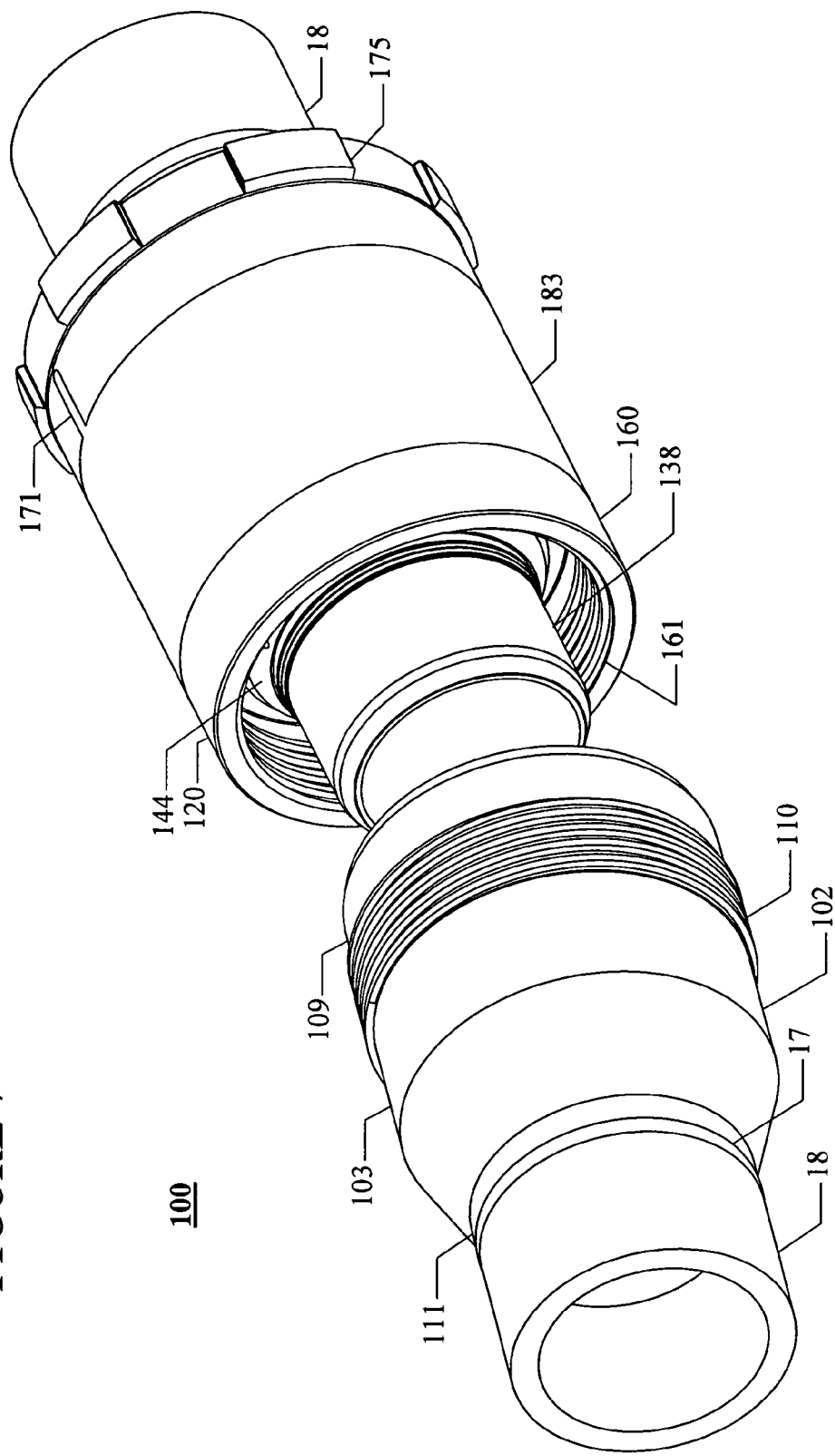
FIG. 7 shows an oblique view of a second embodiment of the tubular connector according to the present invention wherein the male and female sides of the connector are misaligned prior to stabbing.
Figure 8:
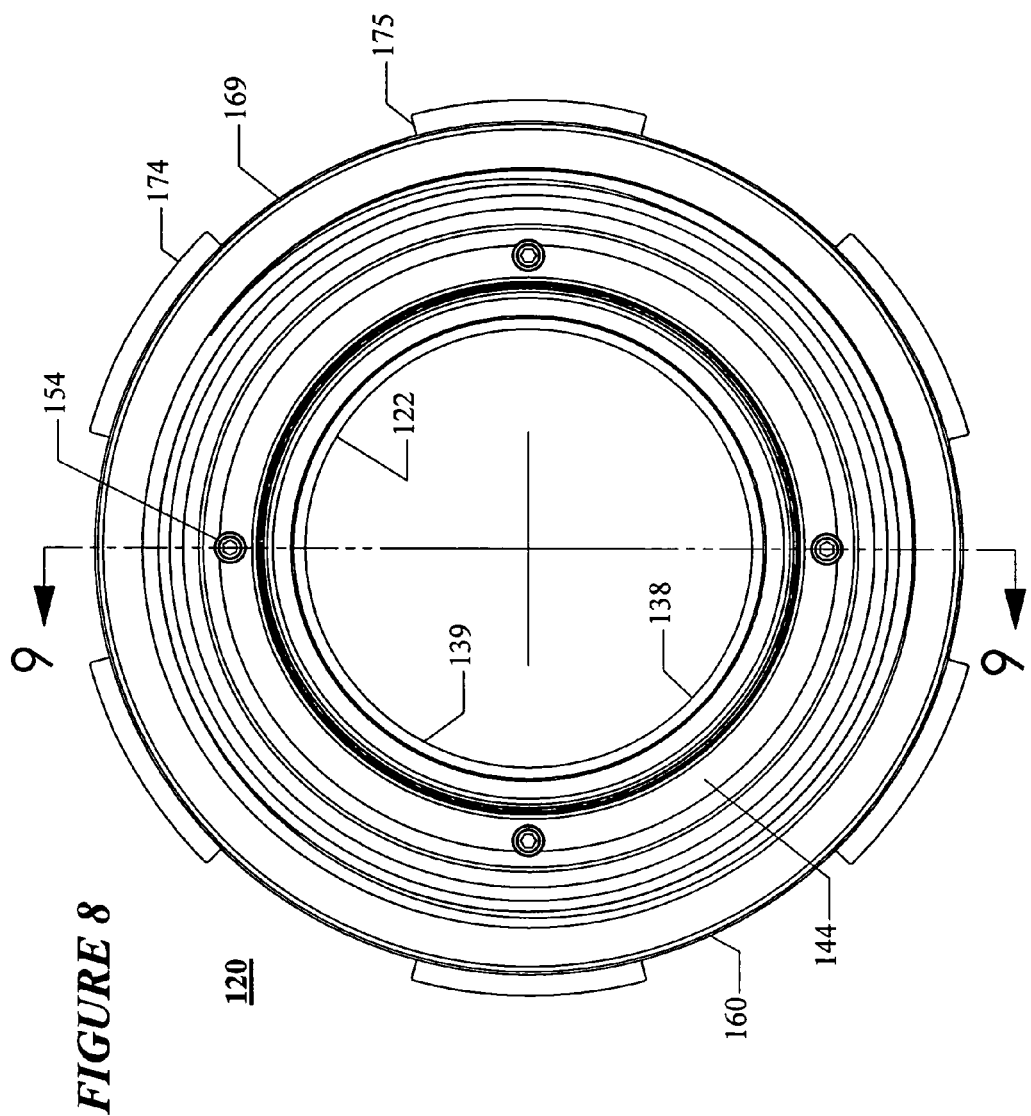
FIG. 8 shows an axial view of the outlet end of the female side of the connector shown in FIG. 7 prior to stabbing.
Figure 10:
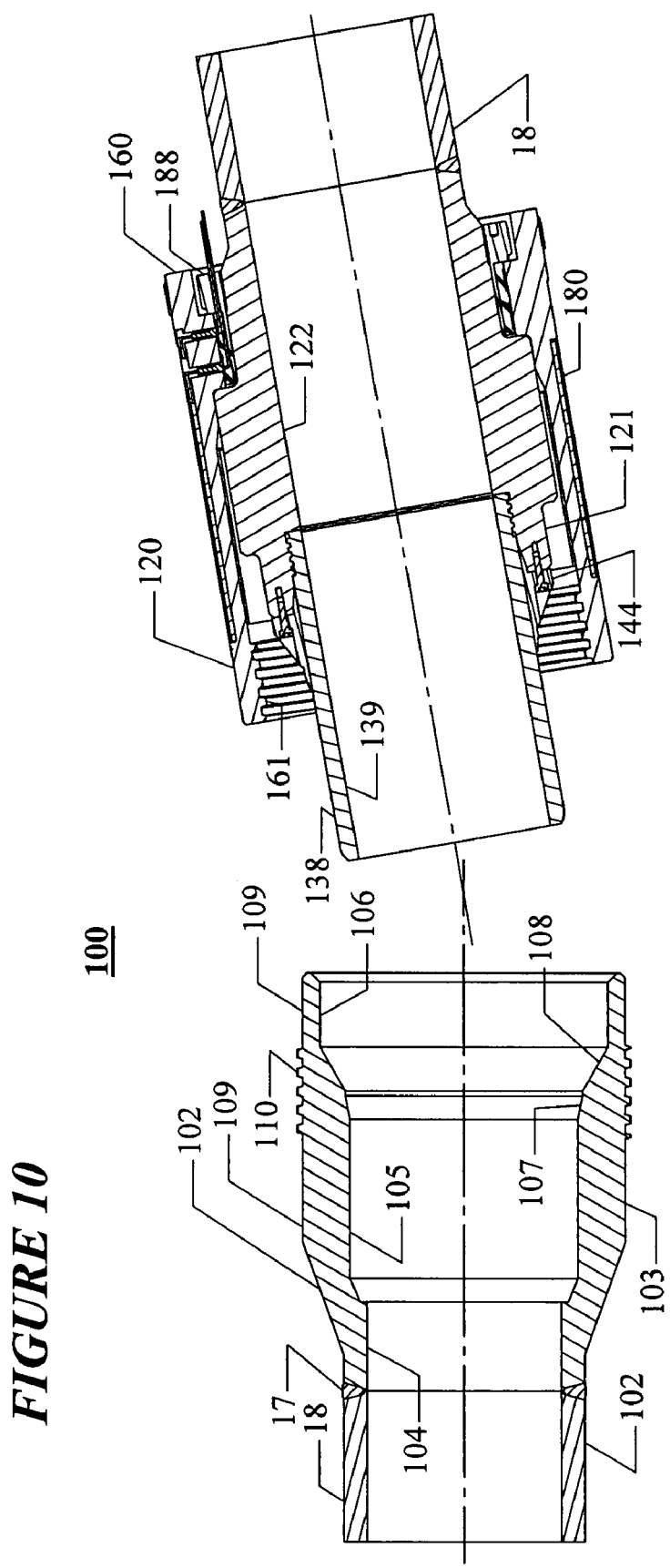
FIG. 10 shows a longitudinal sectional view of the misaligned connector shown in FIG. 7 as stabbing is initiated.

As seen in FIG. 7, the tubular connector consists of a male side 102 and a female side 120. In FIG. 10, it can be seen that the male side 102 has an externally upset male pin 103 with a through bore 104, a first counterbore 105, and a second counterbore 106. Located between first counterbore 105 and second counterbore 106 is conical seal recess 107 and a larger diameter conical abutment 108 which has a larger flare angle than seal recess 107. On its exterior, pin 103 has cylindrical outer surface 109 on which continuous male thread 110 is positioned approximately in the middle. On the outer end of pin 103 is weld neck 111, where tube 18 is joined to weld neck 111 by circumferential weld 17. Tube 18 is shown as a short segment for purposes of illustration, but typically will be a portion of a pressure containing vessel such as a pipeline.

Figure 9:
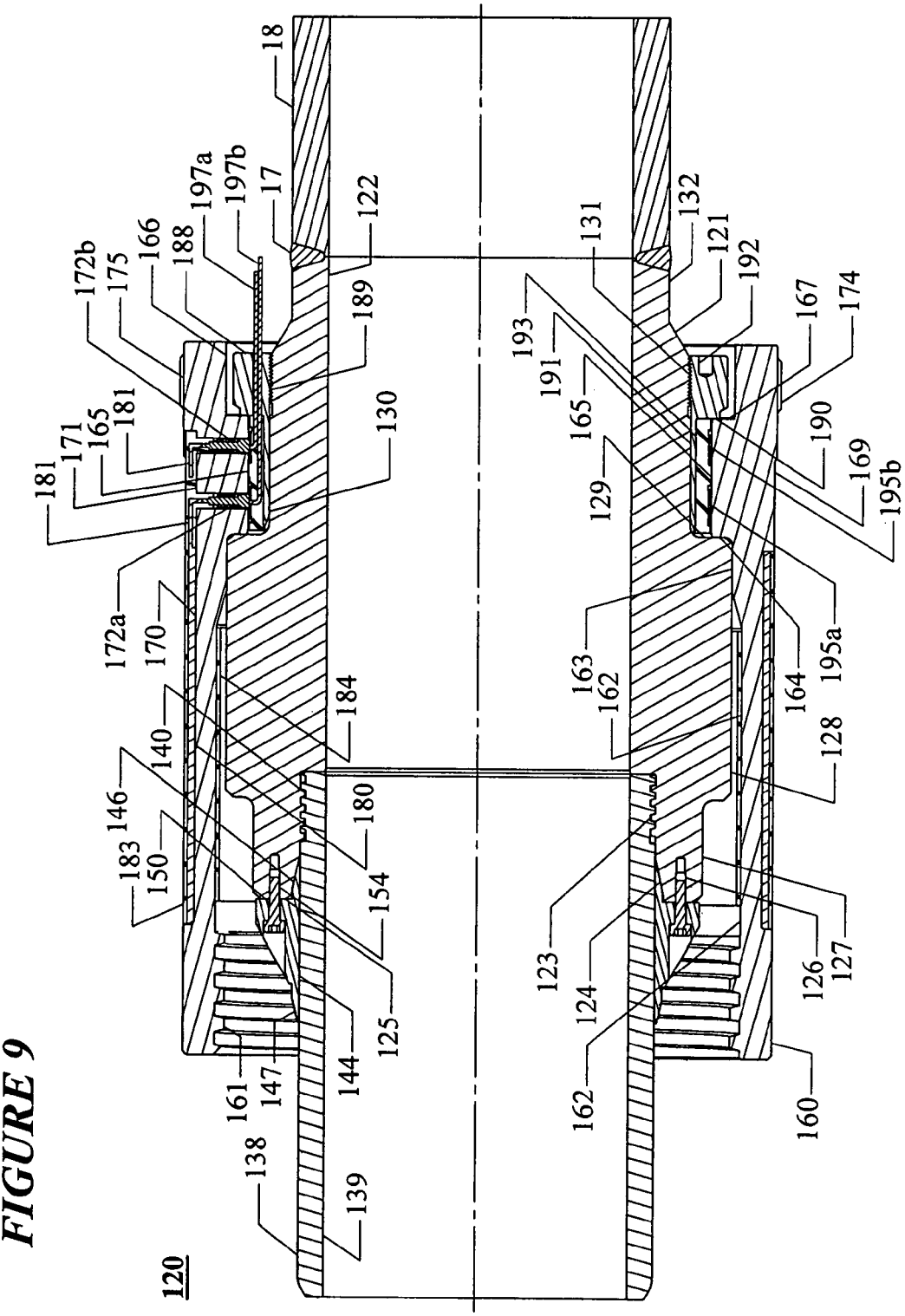
FIG. 9 is a longitudinal sectional view of the female side of the connector shown in FIG. 7.

Female side 120 is shown in more detail in the longitudinal cross-section of FIG. 9. Female side 120 consists of a nut hub 121 that supports an annular nut 160. Nut hub 121 has a through bore 122 and a female threaded counterbore 123 on its inner end. The throat of counterbore 123 has conical seal recess 124 positioned between the counterbore 123 and the transverse inner shoulder 125. Transverse inner shoulder 125, having a bolt circle of multiple drilled and tapped holes 126, connects conical seal recess 124 with inner end external surface 127. Moving outwardly sequentially from inner end external surface 127 are externally upset cylindrical head 128, transverse outer shoulder 129, outer end external cylindrical surface 130, outer end male threads 131, and weld neck 132. Nut hub 121 is joined to another tube 18 by circumferential weld 17.

Stabbing nose 138 has a through bore 139 that matches the bore 122 of nut hub 121 so that the two present a smooth flow passage. Stabbing nose 138 is coaxially mounted in the inner end of nut hub 121 by male thread 140 which is threadedly engaged with the female threads of counterbore 123 of nut hub 121. The exterior leading edge of stabbing nose 138 has a large chamfer to ease stabbing of the connection.

Figure 13B:
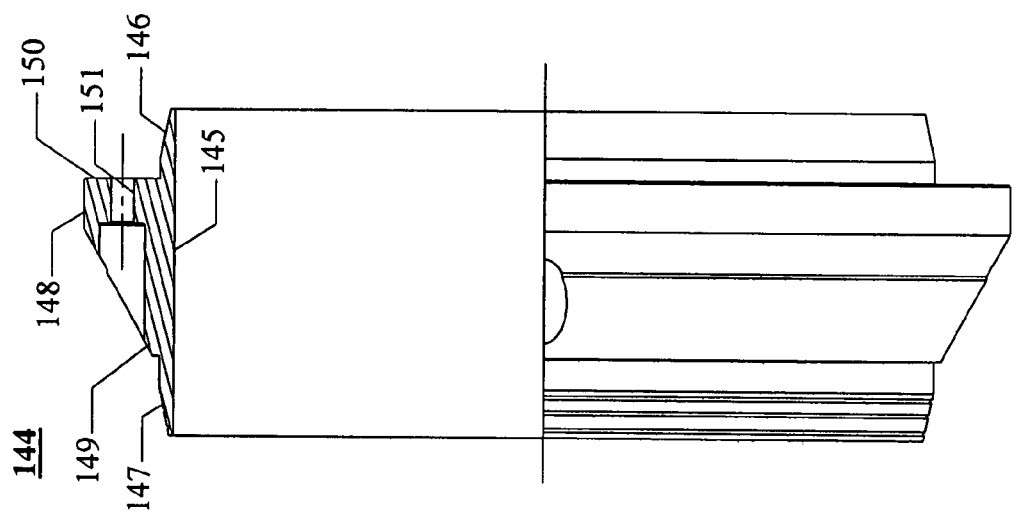
FIG. 13B shows a quarter-sectional transverse view of the seal of the connector shown in FIG. 7.
Figure 13A:
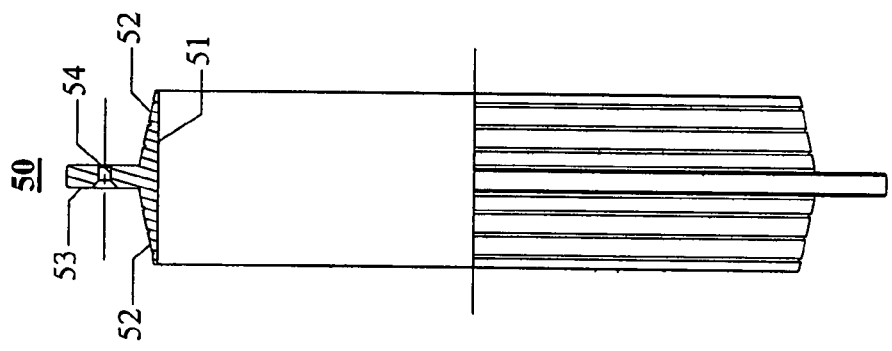
FIG. 13A shows a quarter-sectional transverse view of the seal of the connector shown in FIG. 1.

Seal 144, shown mounted in FIG. 9 and in more detail in FIG. 13B, has through bore 145, first conical sealing face 146, second conical sealing face 147, and central external flange 148. Through bore 145 is sized to readily slip over the exterior cylindrical face of stabbing nose 138. First conical sealing face 146 has a taper to match that of the conical seal recess 124 of nut hub 121, but has a mild interference fit with recess 124 when fully engaged with that comating surface. The exterior of first conical sealing face 146 is smooth, since it is installed into recess 124 under controlled conditions. Second external conical sealing face 147 is similarly configured to that of first conical sealing face 146, but is provided with annular grooves to permit screeding trash out of its comating conical seal recess 107 of pin 103. The annular grooves additionally permit the forming of redundant comating sealing surfaces with seal recess 107 when seal 144 is engaged with pin 103. Flange 148 has a conical face 149 with a flare angle matching that of conical abutment 108 of pin 103 so that when the two surfaces are mated, flange 148 serves as a travel limiter to prevent overstressing second conical sealing face 147 when stabbing. The obverse side of flange 148 has transverse face 150 that abuts transverse inner shoulder 125 of nut hub 121. Seal 144 is mounted to nut hub 121 by multiple screws 154 engaged through multiple counterbored holes 151 in flange 148 and the coaxial drilled and tapped holes 126 of nut hub 121.

Annular nut 160 has, starting at its inner interior end, continuous female threads 161, undercut enlarged bore section 162, a reduced diameter guide bore section 163 which closely fits to the externally upset cylindrical head 128 of nut hub 121, an interior transverse shoulder 164, through bore 165, and outer end counterbore 166. Outwardly facing transverse shoulder 167 connects through bore 165 and outer end counterbore 166. Interior transverse shoulder 164 abuts transverse outer shoulder 129 of nut hub 121 so that the nut 160 can be used to apply compressive preload to the connector 100.

The external cylindrical surface 169 of nut 160 has a central undercut heater groove 170 of constant diameter with a narrow and shallow heater wire slot 171 parallel to the nut axis connecting the heater groove to radial contactor mount through holes 172a,b. The contactor mount through holes 172a,b penetrate from the external cylindrical surface 169 to through bore 165 of nut 160. The outer end of nut 160 has externally upset outer end 174 into which multiple external drive splines 175 are cut.

Annular electrical heater sleeve 180 closely fits into external heater groove 170 of nut 160. Two heater wires 181 run from the electrical heater sleeve 180 to individual spring loaded contactors 182a,b, which are in turn press-fitted or otherwise suitably mounted in radial contactor mount through holes 172a,b. An annular layer of thermal insulation is provided over electrical heater sleeve 180 by external heater insulation 183, while internal nut insulation 184 lines the undercut bore section 162 of nut 160 and provides thermal insulation adjacent the electric heater sleeve 180.

Nut retainer 188 has a fairly short annular body with interior female threads 189 threadedly engaged with outer end male threads 131 of nut hub 121. The outer diameter of nut retainer 188 fits within the outer end counterbore 166 of nut 160. Transverse inner shoulder 190 of nut retainer 188 abuts the outwardly facing transverse shoulder 167 of nut 160 to maintain the nut on nut hub 121. Projecting inwardly from the main body of nut retainer 188 is support sleeve extension 191 which has its inner and outer diameters intermediate between those of the main body of nut retainer 188. On the outer transverse face of nut retainer 188 are multiple spanner holes 192 to permit driving the nut retainer onto the outer end male threads 131 of nut hub 121.

Figure 14:
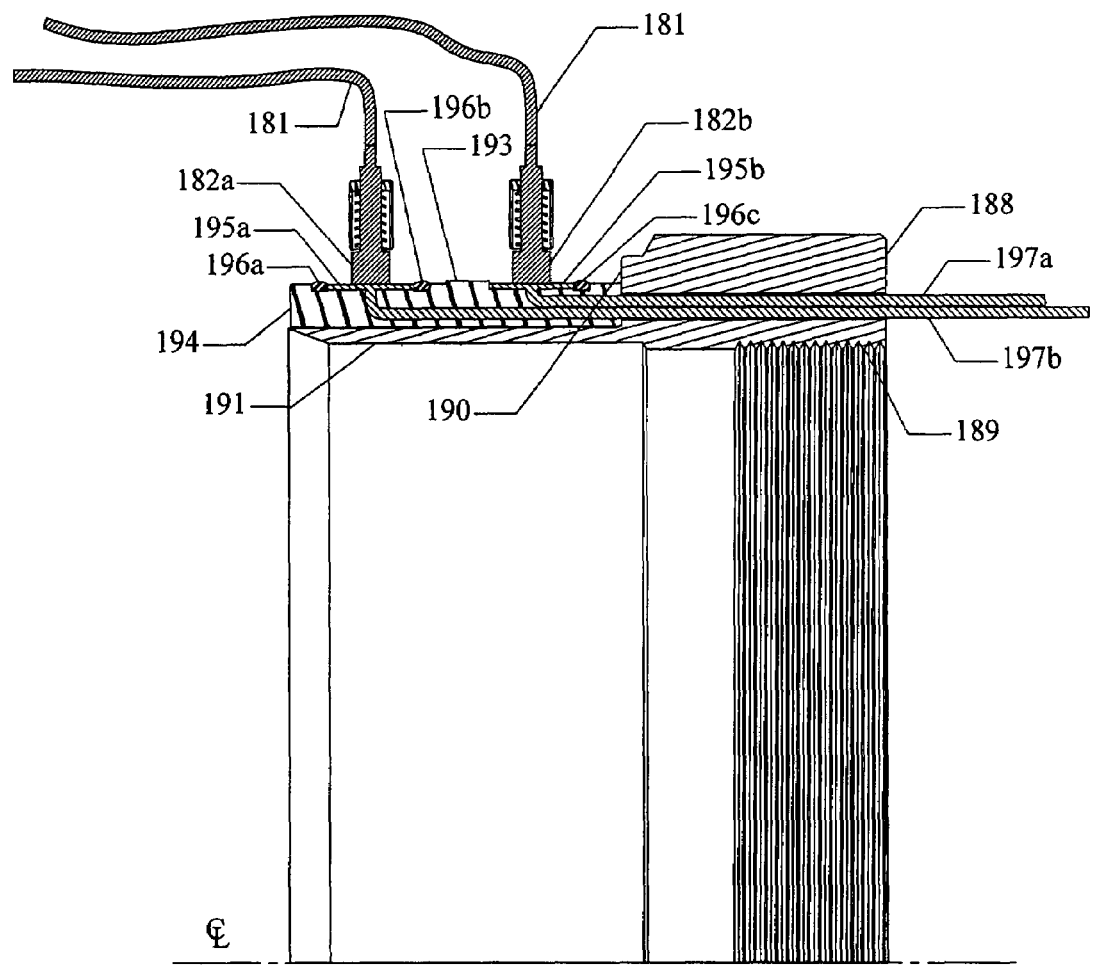
FIG. 14 shows a quarter-sectional transverse view of the seal of the electrical slip rings and related hardware used in the connector shown in FIG. 7.

Slip ring assembly 193, best seen in FIG. 14, consists of elongated annular insulator 194 into which two copper strip conductor rings 195a,b and their associated feed wires 197a,b are molded so that the copper rings are exposed on the exterior cylindrical surface of the assembly. The bore of insulator 194 is made to closely fit on the outer diameter of support sleeve extension 191. A through hole parallel to the axis of nut retainer 188 permits feed wires 197a,b to pass through the nut retainer to be connected with an external electrical power source (not shown). Three O-rings 196a,b,c straddle the copper conductor rings 195a,b so that the rings will be electrically isolated. For subsea use, nonconductive oil or grease will be used to fill the voids between the O-rings and the spring loaded contactors 182a,b. The copper conductor rings 195a,b are respectively positioned to make full electrical contact with spring loaded contactors 182a,b of nut 160 so that the electrical heater sleeve 180 can be supplied with electric power through feed wires 197a,b.

Figure 11:
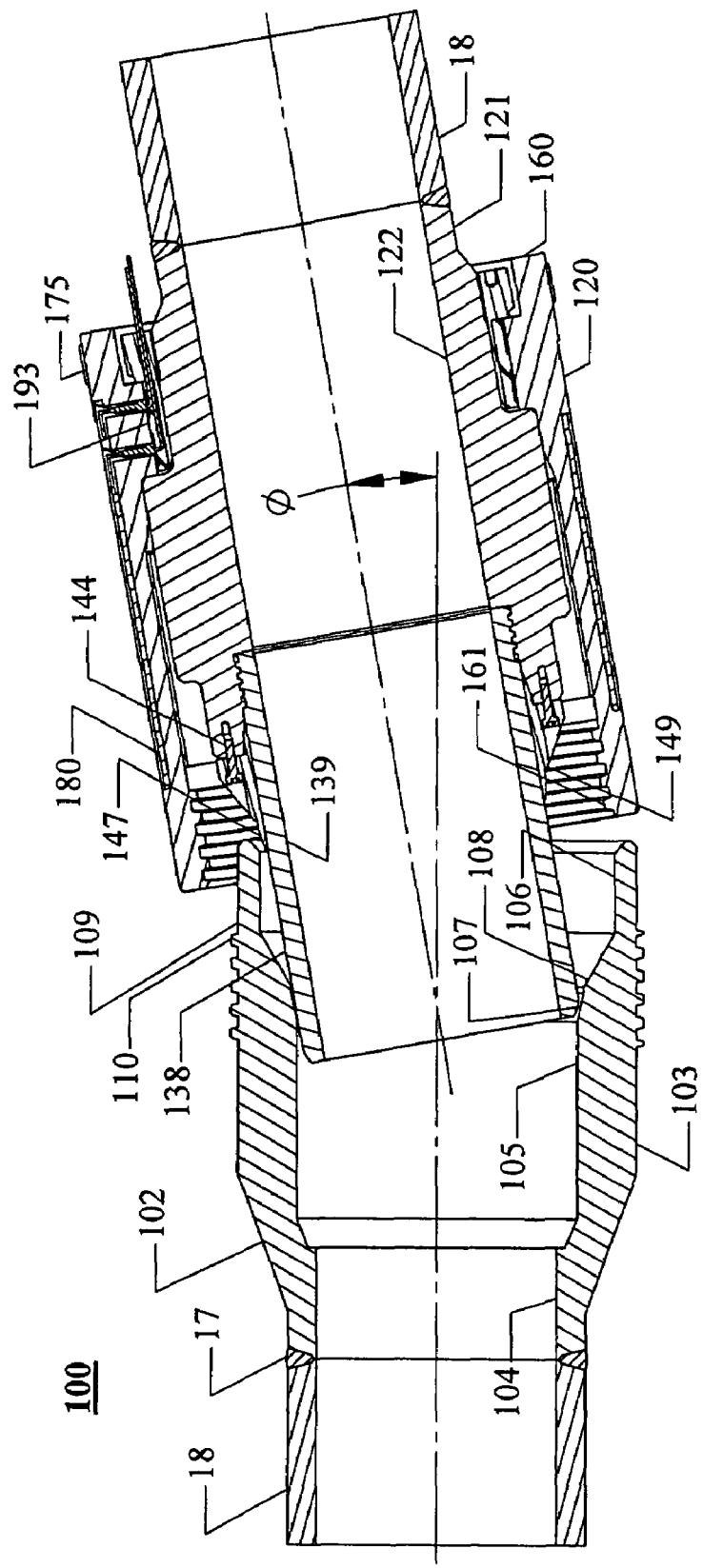
FIG. 11 shows a longitudinal sectional view of the connector shown in FIG. 7, where the stabbing is more advanced that in FIG. 10.

The second embodiment of this invention, shown in FIGS. 7-14, is operated in the following manner. FIG. 7 shows the male side 102 and the female side 120 of the connector 100 positioned to initiate stabbing. It is assumed that the male side 102 is held fixed, while the female side 120 is only constrained against rotation about its longitudinal axis. The construction of connector 100 is such that it can be stabbed in cases when the connection halves are significantly misaligned because of axial offset and inclination of the stabbing axes relative to each other, as shown in FIGS. 7, 10, and 11.

Figure 12:
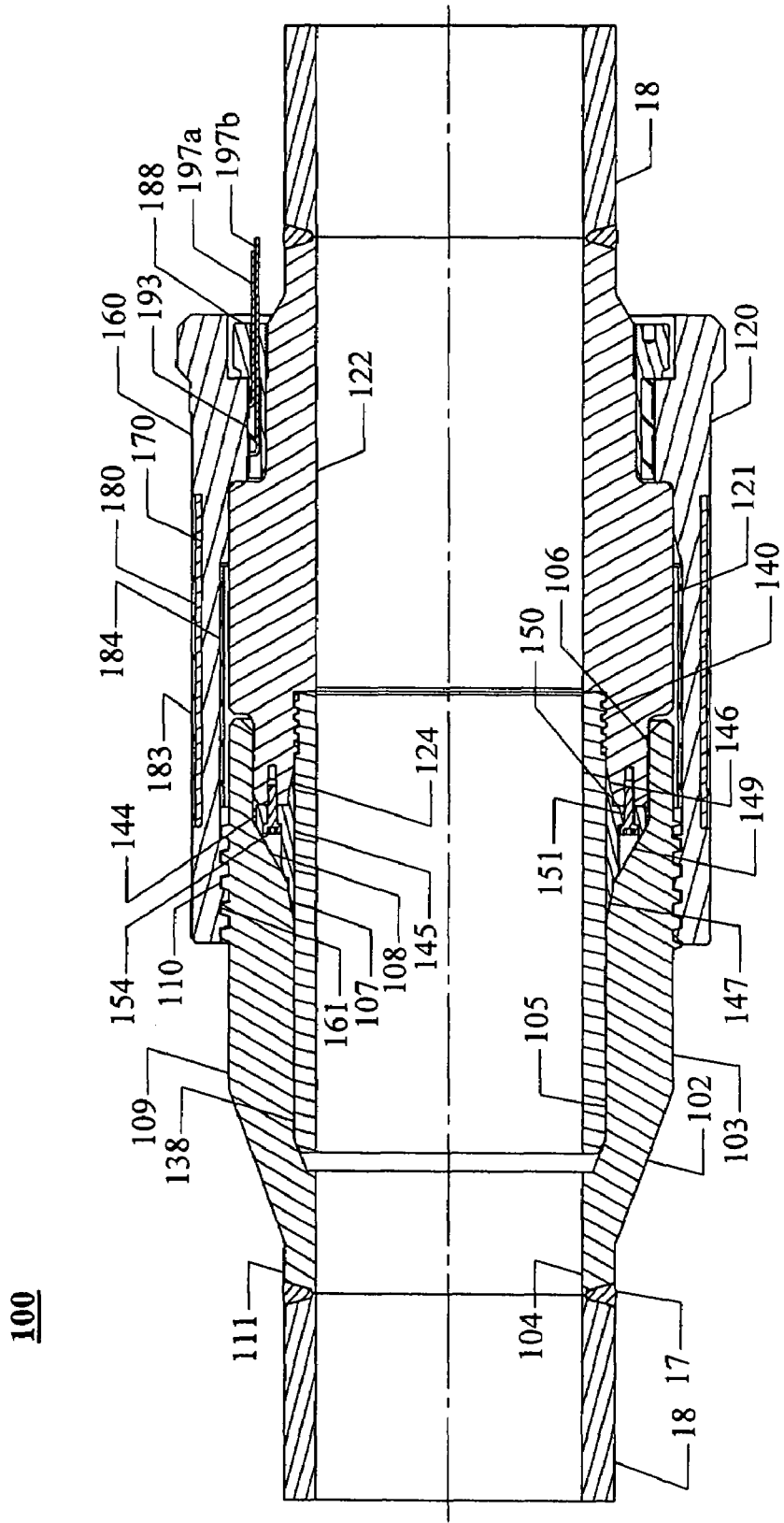
FIG. 12 shows a longitudinal sectional view of the connector shown in FIG. 7 that is fully stabbed.

The stabbing of connector 100 is sequentially shown in FIGS. 10-12. Normally, nut 160 is continuously rotated while stabbing is being conducted by torque applied to the nut through its external drive splines 175. No specific device for applying the torque to the nut is shown, but hollow spindle hydraulic motors or other types of drives are commonly available and applicable. It should be noted that the geometry shown here is used for cases when the axial misalignment between the connection halves is significant but not excessive, or not more than approximately 12 degrees.

FIG. 10 shows the male 102 and female 120 halves of the connection after stabbing is initiated by causing axial movement of female side 120 so that stabbing nose 138 is caused to enter the throat of second counterbore 106 of pin 103. The tolerable lateral offset of the axes of the male side 102 and the female side 120 of connector 100 is equal to half of the difference between the second counterbore 106 and the outer diameter of the stabbing nose 138. With the additional stabbing travel to attain the relative positions shown in FIG. 11, the throat of nut 160 is caused to slide with a loose fit over the cylindrical outer surface 109 of pin 103. Since the nut 160 is being rotated, continuation of the stabbing at some point permits initiation of threaded engagement between female threads 161 of nut 160 and male threads 110 of pin 103.

When the connection is stabbed further to the state shown in FIG. 11, the conical face 149 of flange 148 of seal 144 has interacted with the throat of second counterbore 106 of pin 103 to begin to compel axial alignment between the two connection halves. At the stage of stabbing shown in FIG. 11, initial angular alignment of the halves of connector 100 is induced by opposed radial reactions between firstly the nose of stabbing nose 138 and the conical abutment counterbore 108 and conical seal recess counterbore 107 and secondly the nut 160 and the outer surface 109 of pin 103.

As stabbing progresses further, the opposed transverse radial reactions between firstly stabbing nose 138 and male side 102 counterbores 105, 106, 107, and 108 and secondly flange 148 of seal 144 and second counterbore 106 produce a moment which is able to act to induce any required axial alignment. The maximum angle of stabbing misalignment (referred to in FIG. 11 as $\Phi$) of connector 100 is determined by two dimensions: 1) the difference between the outer diameter of the seal 144 and the outer diameter of the stabbing nose 138 and 2) the distance of separation between the end of stabbing nose 138 and the point of intersection of the conical face 149 and the outer diameter of the seal 144. One-half the first dimension divided by the second dimension is equal to the tangent of the maximum angle of stabbing misalignment ( ). Thus, if the nut 160 is shortened sufficiently and the male threads 110 are correspondingly moved nearer to the inner end of pin 103, then nut 160 will not be active in correcting angular stabbing misalignments. Following this axial alignment of the connection, further stabbing causes second conical sealing face 147 of seal 144 to enter into and engage conical seal recess 107 of pin 103. As the second conical sealing face 147 enters the seal recess 107, the external annular grooves of seal 144 aid in screeding trash off the interface, and the multiple annular conical surfaces between the grooves offer redundant seal surfaces.

Completion of the stabbing operation is shown in FIG. 12, when seal 144 is fully seated in conical seal recess 107 of pin 103. Abutment of conical face 149 of seal 144 against the conical abutment 108 of pin 103 prevents overcompression of seal 144 in seal recess 107. At this point the nut 160 is torqued to its initial pretension by applying torque to the external drive splines 175 by some suitable drive means. This level of pretension is sufficient to keep the seal 144 fully engaged in conical seal recess 107, but the connection is insufficiently preloaded to either avoid fatigue of the threaded portion of the connection or to transfer high bending moments across the connection.

Accordingly, after the nut 160 is initially pretensioned, electric power is applied to the electric heater sleeve 180 via heater feed wires 197a,b and the slip ring assembly 193. Using the same methods as for the first embodiment of this invention, the nut is caused to thermally expand by an amount corresponding to a desired preload strain, the nut 160 is retorqued, power is removed from the electric heater sleeve 180, and then the nut is cooled. At this point, the connection is fully prestressed so that large bending moments can be carried and the threaded portion of the connection will not be fatigue sensitive. Similarly to the first embodiment of this invention, this embodiment can be disconnected by reheating the nut 160 to the prior setting temperature or a somewhat higher temperature and then unscrewing the nut and unstabbing the connector.

For cases when severe misalignment can be expected, both first counterbore 105 of pin 103 and stabbing nose 138 can be lengthened sufficiently to produce sufficient axial alignment between the two halves 102 and 120 of the connection before the throat of nut 160 begins to stab over pin 103. In such a case, stabbing nose 138 would already be fully engaged with first counterbore 105 sufficiently that the connector could be forced into sufficient axial alignment to allow nut 160 to clear pin 103. Provision of an enlarged bell mouth of nut 160 and increased clearance between the minor diameter of the female threads 161 of nut 160 and cylindrical outer surface 109 of pin 103 can be used to further enhance the misalignment tolerance for the connector 100. This approach is limited by the load capacity of the nut centralizing interface between guide bore section 163 of nut 160 and the externally upset cylindrical head 128 of nut hub 121.

In very severe misalignment cases where it is necessary to avoid overstress of the nut centralizing interface, interior transverse shoulder 164 of nut 160 can be set back sufficiently from the mouth of the nut to ensure that both stabbing nose 138 and flange 148 of seal 144 are fully engaged by the first counterbore 105 and the second counterbore 106 of pin 103 before the nut 160 stabs over the exterior of the pin. This arrangement permits the transverse reactions between the two interacting stabbing surfaces to produce a bending moment for aligning the connection as it is stabbed.

Example 3

The third embodiment 200 of the pressure containing tubular connection is shown in FIGS. 15-18. This connector 200 uses several of the same components as the first embodiment, but uses a different pin and nut hub and seal type. Connector 200 utilizes a face seal which is suited for applications where the relative axial alignment and position of the two connection halves is closely controlled by guidance provided by the stabbing means. This type of connection would be suitable for shop make up or possibly a guided remote make up in a relatively clean environment. For this embodiment, an anti-rotation guide is used to effectively key the two sides of the connection together so that the face seal is not rotated across its mating surfaces. Where the components used for this third embodiment are identical to those used by the first embodiment, identical numbering and descriptions are used.

Figure 15:
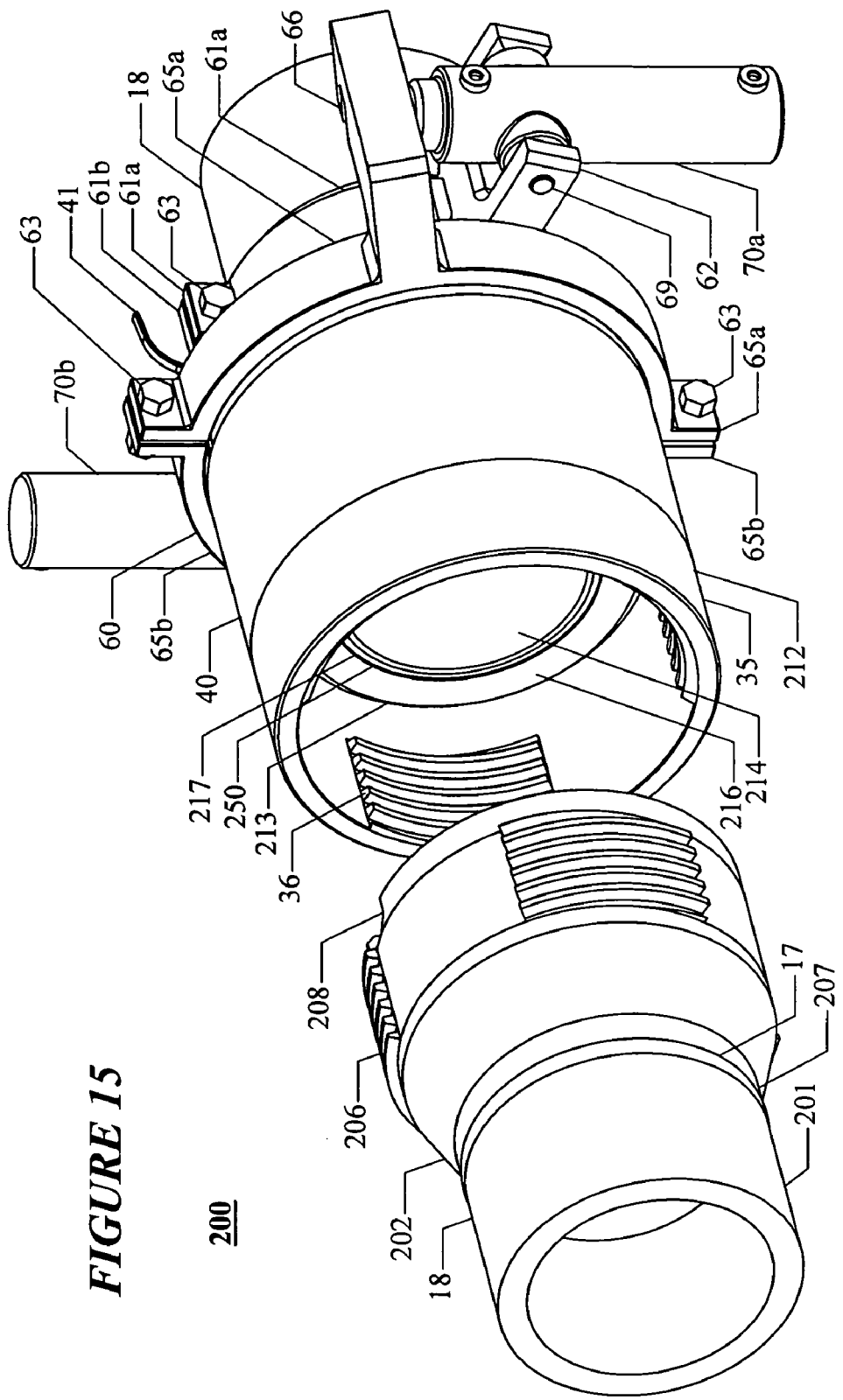
FIG. 15 shows an oblique view of a third embodiment of the connector according to the present invention.

As seen in FIG. 15, the tubular connector consists of a male side 201 and a female side 212. Further referring to FIGS. 16 and 17, the male side 201 has an externally upset male pin 202 with a through bore 203 and a transverse mating face 204 at its inner end. The outside cylindrical surface of pin 202 has male interrupted threads 206. The end of pin 202 obverse to mating face 204 is tapered to a weld neck 207. Guide pocket 208 is machined into the outer cylindrical surface of pin 202 at its junction with transverse mating face 204. Guide pocket 208 has planar sides parallel to the axis of pin 202 for the engagement of a keying element 227 carried by the female side 212 of the connector 200. Circumferential weld 17 joins weld neck 207 to tube 18. Tube 18 is shown as a short segment for purposes of illustration, but typically will be a portion of a pressure containing vessel such as a pipeline.

Figure 16:
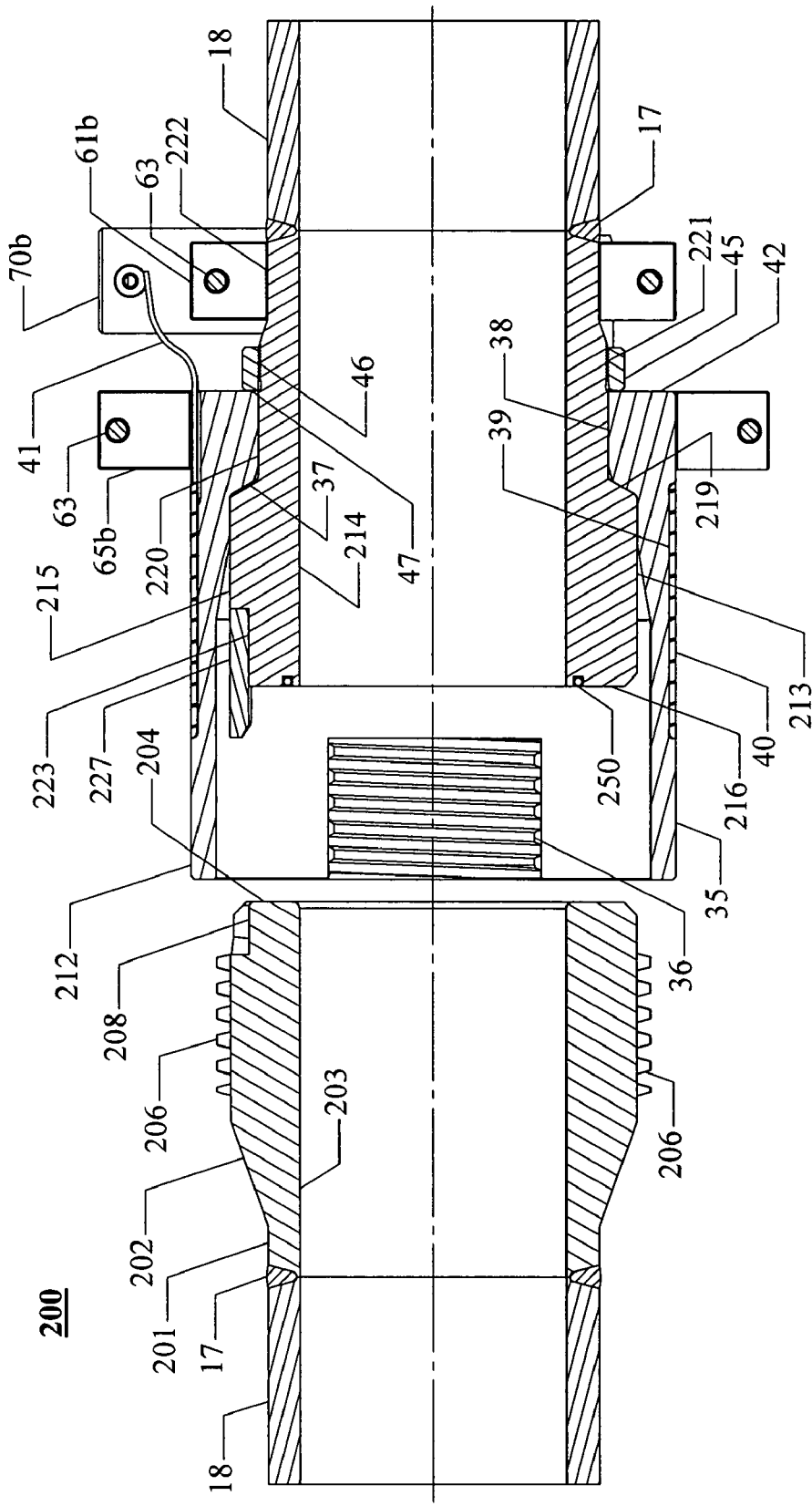
FIG. 16 is a longitudinal sectional view of the connector of FIG. 15 positioned for initiating stabbing.
Figure 17:
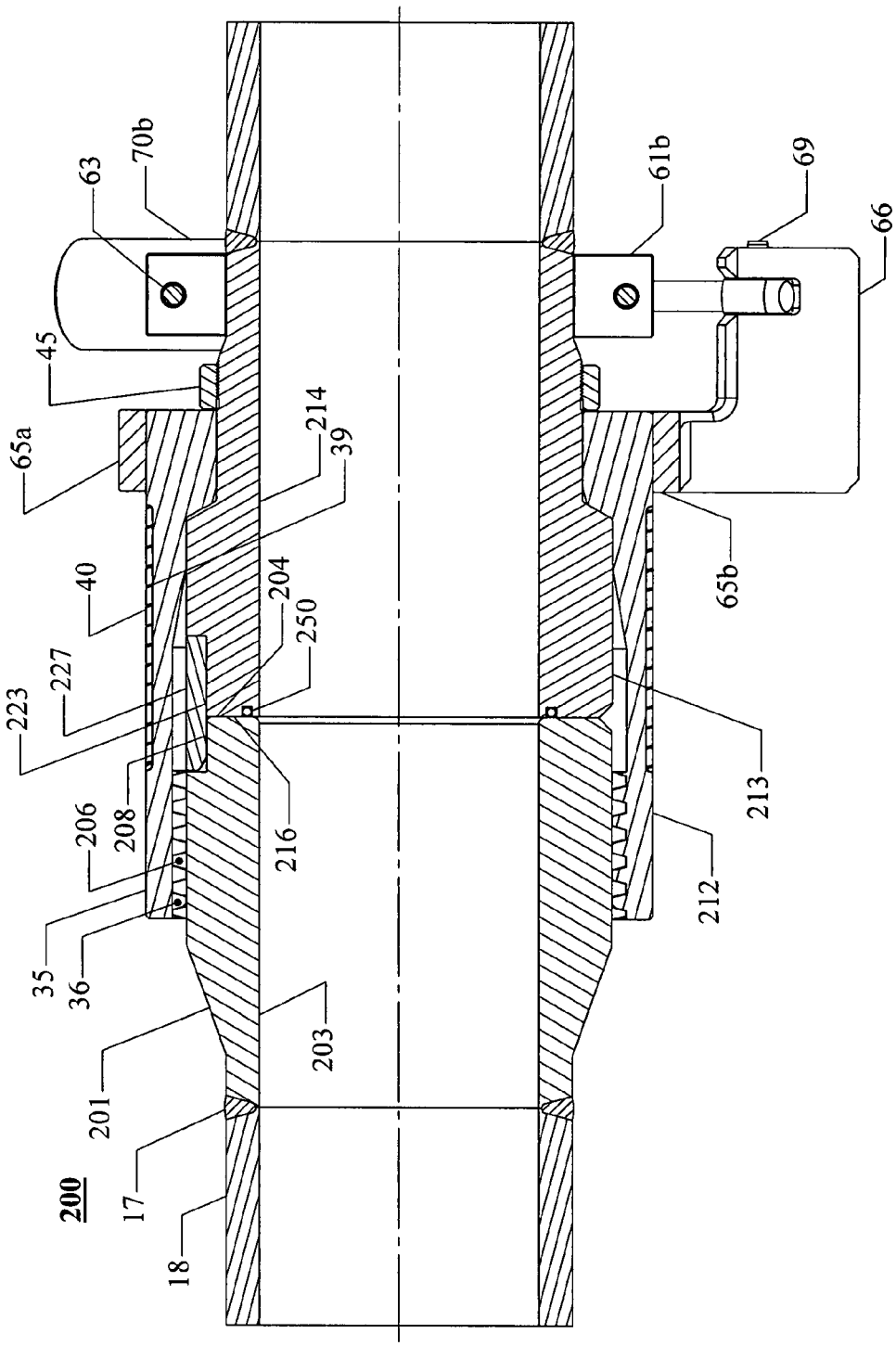
FIG. 17 is a longitudinal sectional view of the connector of FIG. 15 stabbed and tightened.
Figure 18:
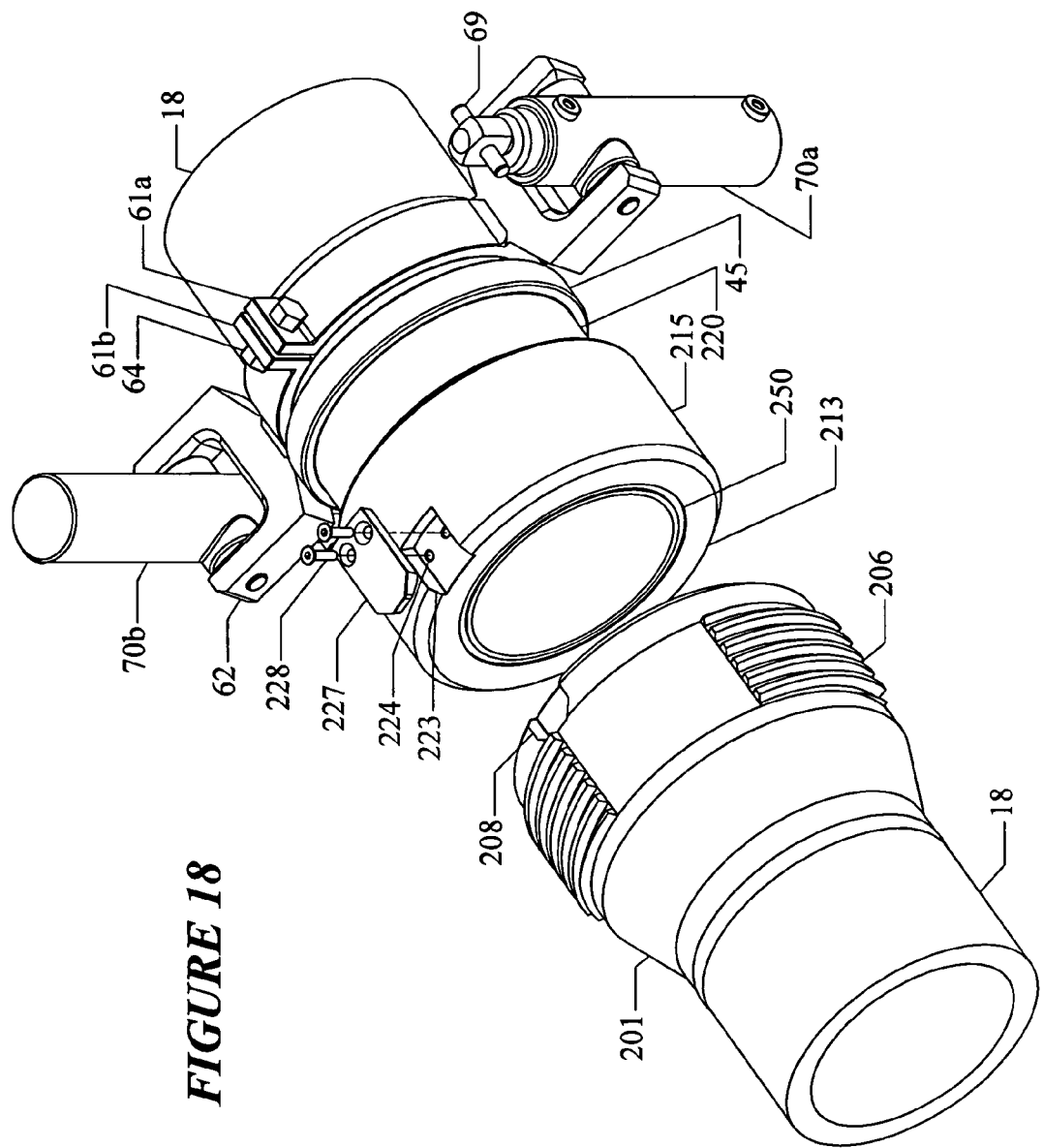
FIG. 18 is a partially exploded oblique view of the connector of FIG. 15 positioned ready to stab, but with the nut of the female side of the connector removed to show the antirotational keying of the connector.

Female side 212 of the connector consists of a nut hub 213 which supports nut 35. FIG. 18 is a partially exploded oblique view which shows the exterior cylindrical faces of both male side 201 and female side 212 of the connector with the connecting nut and its directly connected components removed for clarity in describing certain components. Referring to FIGS. 16-18, nut hub 213 has a through bore 214, an externally upset cylindrical head 215, and a transverse mating face 216. Seal mounting groove 217 is positioned intermediately in transverse mating face 216 and serves to mount a face seal. Obverse to mating face 216 and in order of distance from face 216 on the exterior of nut hub 213 are external conical abutment shoulder 219 and adjacent cylindrical nut guide surface 220. Adjacent to guide surface 220 are a male thread 221 and weld neck 222. Located at the intersection of the upset head 215 and transverse face 216 of nut hub 213 is guide mounting pocket 223. The sides of guide mounting pocket 223 are planar and parallel to the diametral midplane of symmetry of nut hub 213. Guide mounting pocket 223 is configured to mount a keying element 227 to prevent relative rotation of the nut hub 213 and the pin 202 when the two pieces are mated. Two drilled and tapped holes 224 are provided in the bottom of guide mount pocket 223.

Guide 227 is closely fitted into guide mounting pocket 223 of nut hub 213 and mounted thereto by means of guide mounting screws 228 engaged both in countersunk holes in guide 227 and the drilled and tapped holes 224 in the nut hub 213. Weld neck 222 of nut hub 213 is joined by circumferential weld 17 to another connecting tube 18. Note that the sizes of the weld necks and connecting tubes need not be identical for both sides of the connector.

Annular nut 35 has interrupted female threads 36 comatable with the male threads 206 of pin 202 at its inner interior end and interior conical shoulder 37 and guide bore 38 at its outer end. Shoulder 37 bears against corresponding shoulder 219 of nut hub 213, while bore 38 mates with guide surface 220 of nut hub 213, thereby controlling axial position and maintaining axial orientation of the nut 35 relative to nut hub 213. The outside diameter of nut 35 is uniform except for a central annular groove 39 which contains closely fitted electrical heating element 40. A surface groove parallel to the nut axis on the inner end of nut 35 contains the connecting wires 41 of heating element 40. The outer end 42 of nut 35 is transverse to the axis of the nut.

Annular keeper ring 45 has in its bore female threads 46 which are screwed together with male thread 221 of nut hub 213 so that its transverse shoulder 47 abuts inner end 42 of nut 35 and thereby retains nut 35 on nut hub 213.

Seal 250 is shown as a metal O-ring, but a metal C-ring, an elastomeric O-ring, or several other types of face seals would be suitable and would fit in groove 217 of nut hub 213. Seal 250 extends slightly from groove 217 so that it will be presqueezed when it contacts and seals against transverse mating face 204 of pin 202 and the surface of seal groove 217. The abutment of transverse mating face 216 of nut hub 213 against transverse mating face 204 of pin 202 prevents overcompressing seal 250.

Torquing system 60 comprises of a pair of identical first ring clamp halves 61a,b and a pair of identical second ring clamp halves 65a,b, respectively mounted to the nut hub 213 and the nut 35, and a pair of identical hydraulic cylinders 70a,b tangentially mounted to those ring clamps. Radially projecting from each first ring clamp half 61a,b is a cylinder trunnion mounting bracket 62. The first ring clamp halves 61a,b are bolted together by a pair of bolts 63 and nuts 64 through holes on the radially projecting brackets 62 of the ring clamp so that the clamp halves are rigidly fixed to nut hub 213 by friction. If necessary, interlocking keys, bolts, welding, or other means can be employed to enhance the torque transmission capabilities of the joint between the clamp halves and the nut hub. Similarly for each second ring clamp half 65a,b, a radially projecting rod pin mount 66 is attached. The second ring clamp halves 65a,b are also connected by a pair of bolts 63 and nuts 64 positioned in holes in radially projecting ears so that they tightly grip the nut 35. Again, the joint between the second ring clamp halves 65a,b and nut 35 may be enhanced by welding, keys, or other means. Cylinders 70a,b are each trunnion mounted in a trunnion mounting bracket 62 on the first ring clamp halves 61a,b and have a pin 69 coupling their rod ends to rod pin mount 66 of the second ring clamp halves 65a,b. The cylinders 70a,b are thus positioned so that when their rods are extended, the nut 35 is rotated to cause the nut to tighten, while when their rods are retracted, the nut is rotated to cause it to loosen.

The third embodiment 200 is operated in the following manner. Male side 201 and female side 212 are brought into approximate axial alignment as shown in FIG. 15 and then coaxially stabbed together. This connector 200 is able to tolerate only very minor axial offset and axial angular misalignment. Use of suitable stabbing means familiar to those involved with the field of tubular connections is assumed.

The male side 201 of the connector is assumed to be fixed, while the female side 212 is assumed to be guided so that its axial position and alignment are reliably maintained within acceptable limits. Unlike the previous two embodiments of this invention, the hub of the reciprocating side of the connector is not constrained against rotation. Because interrupted threads 206 and 36 are used, the connection of this third embodiment 200 can be almost fully stabbed before nut 35 is rotated. Rotation is commenced whenever the ends of the interrupted threads 206 and 36 are aligned to permit initial engagement. This occurs before transverse mating face 204 of pin 202 engages the seal 250 and transverse mating face 216. Nut 35 need only rotate a fraction of a revolution to fully engage the interrupted threads of the connection. The positions of threads 206 and 36 on, respectively, the pin 202 and the annular nut 35 are arranged so that maximum thread engagement is obtained at make up. When the transverse mating faces 204 and 216 are brought into sufficiently close proximity, the face of seal 250 engages and sealingly mates with both transverse mating face 204 of pin 202 and the inside transverse face of seal mounting groove 217 of nut hub 213 to effectively seal the connection. The sealing means used for this embodiment is suitable for relatively clean operating environments.

After the male side 201 and the female side 212 of the connector 200 are substantially or fully stabbed together, hydraulic pressure is applied to cylinders 70a,b to cause their rods to extend and thereby rotate the nut 35 about nut hub 213 so that the female interrupted threads 36 of nut 35 are caused to engage the male interrupted threads 206 of pin 202. The limited amount of rotation of the nut does not damage the heater connecting wires 41, since they are provided with sufficient slack and are routed away from moving parts that might damage them. After this initial rotation, the connection is in a state of initial make up. However, due to the limited size and moment arm of the hydraulic cylinders, the axial preload between transverse mating faces 204 and 216 of, respectively, the male 201 and female 212 sides of the connection is insufficient to permit the connection to carry substantial bending moments. Additionally, the threads 206 and 36 will be prone to fatigue damage if not preloaded. Accordingly, electric power is applied to the heating element 40 through connecting wires 41 so that the tensioned tubular section adjacent the heating element between female threads 36 and interior shoulder 37 of nut 35 is heated and thereby expanded. The heating is done until a desired temperature rise and axial extension of the nut 35 is achieved. Although the means is not shown, it is assumed that a thermocouple or thermistor or similar device is emplaced on the heated portion of nut 35 so that its actual temperature may be monitored and power removed from the heating element 40 when the desired temperature is achieved.

Typically, the temperature and its associated amount of thermal strain (i.e., extension) are chosen to be equal to approximately the strain which would be produced if the nut were torqued until its axial tension were a desired percentage (such as for example, half) of the yield stress for the nut. After attainment of this desired temperature, the hydraulic cylinders 70a,b are repressured to retorque the threads 206 and 36, which are loosened when the nut 35 is heated. When the nut is cooled after the electric power to heating element 40 is turned off, the connector 200 will be fully tightened and properly pretensioned so that fatigue is avoided and large bending moments can be transmitted across the connection. Following the cooling and pretensioning of the connection, the connection is able to hold pressure.

Connector 200 is disconnected by first applying heat to nut 35 with the heating element 40 so the nut reaches the same or a somewhat higher temperature than used in tightening. After the nut is stretched sufficiently to reduce the friction on the threads 206 and 36, hydraulic pressure is applied to cause cylinders 70a,b to fully retract to thereby fully disconnect the interrupted threads. At that point, the connection can be unstabbed.

Example 4

A fourth embodiment 300 has a different heating arrangement and has a spring biased nut is shown in FIGS. 19-24. This embodiment of the connection uses many of the same or similar components as the first embodiment. Connector 300 uses the same seal ring 50 with two thin-walled conical seal surfaces as was used for the first connector 1. The pin connection male side 301, the nut hub 311, and the nut retainer 330 are also substantially the same as were used for the first embodiment connector 1. Connector 300, as shown in FIGS. 19-24, is suitable for cases where the stabbing axial alignment and the relative angular positions about that axis are closely controlled and the connection is made up robotically. The provision of the spring bias against the nut hub 311 for the annular nut 340 considerably simplifies the relative axial positioning requirement for the connection during make up.

For the connector 300, it is not necessary to closely control and adjust the relative axial positions of the male side 301 and the female side 310 during thread make up to achieve the initial thread engagement. This is because the position of the nut due to its spring bias is such that the male and female interrupted threads 307 and 341, respectively, automatically are relatively axially positioned to initially engage with rotation when the transverse interior end 305 of the male side 301 is abutted against the exposed transverse face of the seal 50. As the nut 340 is rotated relative to the male side pin 301, the nut advances toward the male side without axial manipulation of the nut hub 311 of the female side 310 relative to the male side. During this rotational make up of the connector 300, the spring bias, which normally spaces the nut 340 away from the nut hub 311, is overcome as the nut translates relative to the male thread 307, so that the connection is tight when the nut shoulders against the nut hub. The heating and retightening cycle previously described is also used for this connection.

Figure 19:
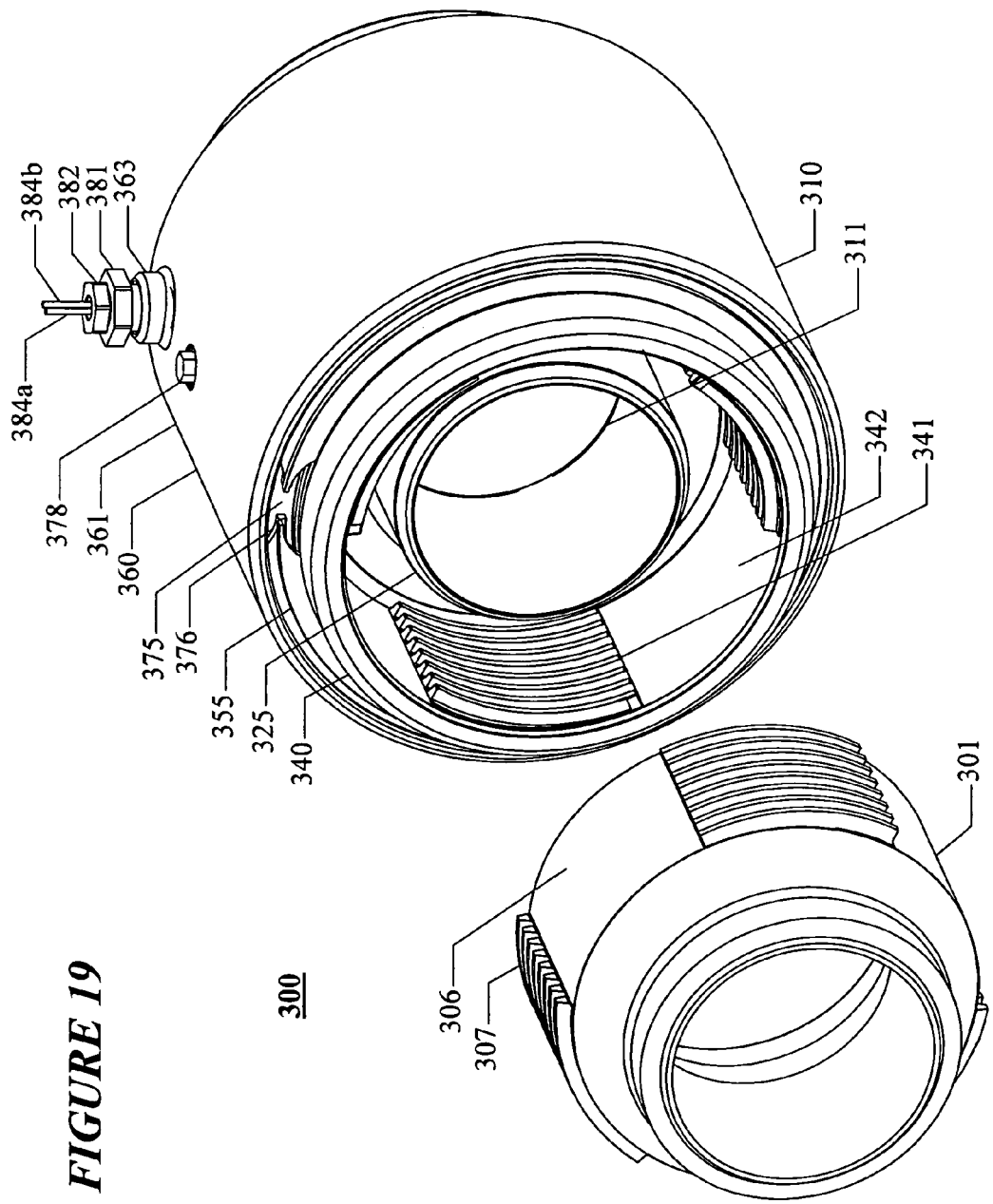
FIG. 19 is an oblique view of another embodiment of the connector according to the present invention where the two sides of the connector are aligned in preparation for connection.

As seen in FIG. 19, the tubular connector 300 consists of a male side 301 and a female side 310. Male side 301 is in most respects identical with the male side 10 of the first connector 100, but it is modified slightly to accommodate a stabbing nose 325. Male side 301 has a through bore 302, a first cylindrical straight counterbore 303, and a inwardly facing transverse interior end 305 having conical seal recess 304 formed between counterbore 303 and face 305. The outside cylindrical surface 306 of male side 301 has three equispaced male multistart interrupted thread sections 307 of about a 57° to 59° arc length. The outer end of male side 301 obverse to the mating face of the transverse interior end 305 is tapered to a weld neck 308. Although not shown here, a circumferential weld 17 may be used to join weld neck 308 of male side 301 to a tube 18, as is shown for the other connectors 1, 100, and 200.

Female side 310 of the connector 300 consists of a nut hub 311 supporting an annular nut 340, a stabbing nose 325, a seal 50, a nut retainer 330, and an heater sleeve 360 associated with the nut. The nut hub 311 is substantially identical to the nut hub 121 of the second connector embodiment 100, with the exception that the outer end male threads 320 upon which nut retainer 330 are mounted are positioned somewhat farther from the outwardly facing transverse shoulder 318 than for the nut hub 121.

Figure 20:
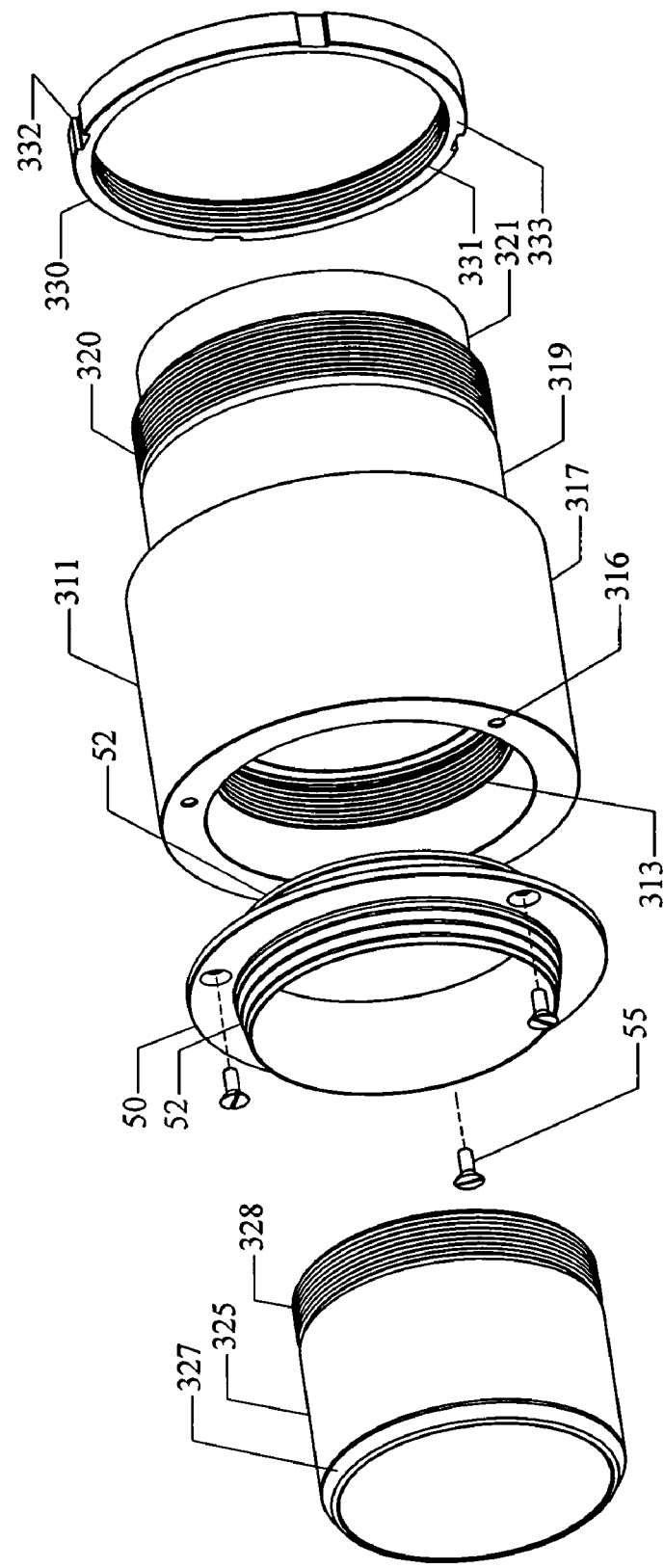
FIG. 20 is an exploded view of the stabbing hub of the connector of FIG. 19.
Figure 23:
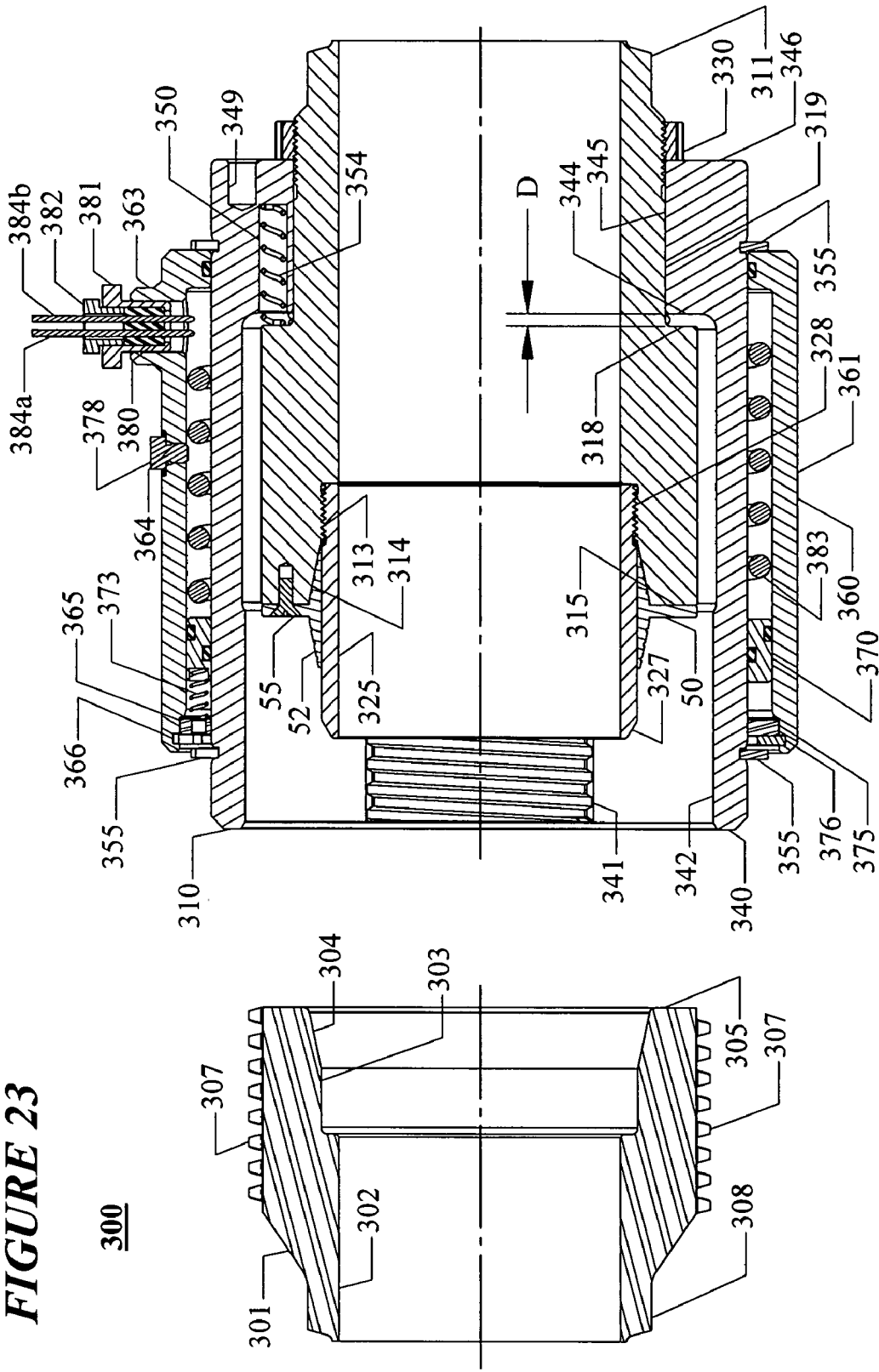
FIG. 23 is a longitudinal cross-sectional view of the connector corresponding to FIG. 19.
Figure 24:
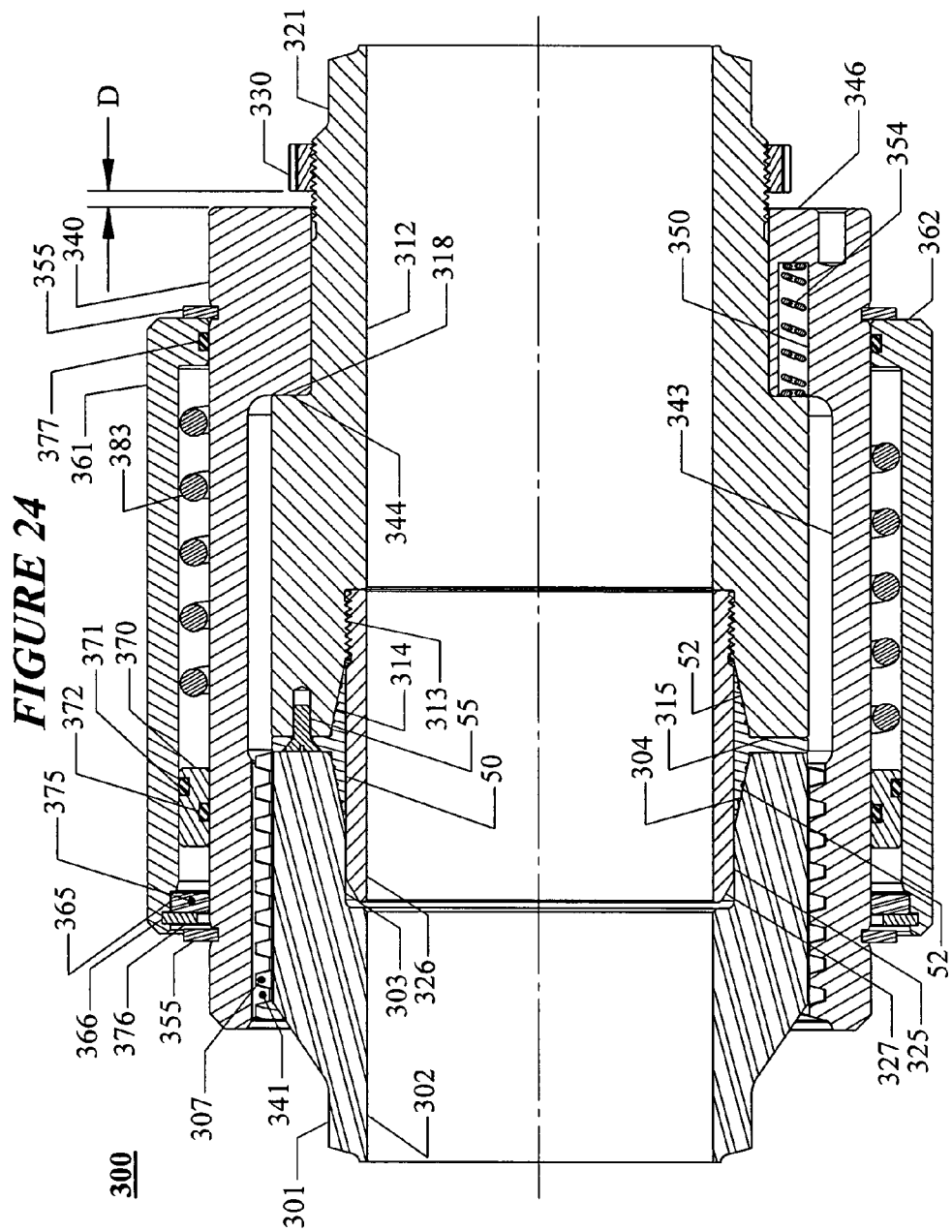
FIG. 24 is a longitudinal cross-sectional view of the connector similar to FIG. 23, but with the connector fully stabbed and connected.

Referring to FIGS. 20, 23, and 24, nut hub 311 has a through bore 312 and a female threaded counterbore 313 on its inner end. The inwardly facing throat of counterbore 313 has conical seal recess 314. Transverse inner shoulder 315, having a bolt circle of multiple drilled and tapped holes 316, connects conical seal recess 314 with external internal end upset cylindrical surface 317. Moving outwardly from transverse inner shoulder 313 are external inner end upset cylindrical surface 317, outwardly facing transverse shoulder 318, intermediate diameter external nut support cylindrical surface 319, outer end male threads 320, and weld neck 321. Although not shown here, nut hub 311 may be joined at weld neck 321 to another tube 18 by means of a circumferential weld 17, as shown for the other connector embodiments. Note that the sizes of the weld necks and connecting tubes need not be identical for both sides of the connection.

Stabbing nose 325 is a short cylindrical tube with a through bore 326 that matches through bore 312 of nut hub 311 so that the two present a smooth flow passage. The stabbing nose 325 is coaxially mounted in the inner end of nut hub 311 by male thread 328, located at the second end of the stabbing nose. Thread 328 is threadedly engaged with the female threads of counterbore 313 of nut hub 311. The first end of stabbing nose 325 has an external stabbing taper 327 for easing the stabbing and alignment of the female side 310 of the connector 300 with the male side 301. The outer diameter of stabbing nose 325 is a relatively close fit to the straight counterbore 303 of male side 301, so that it is capable of providing accurate axial alignment of the connection sides during stabbing. This alignment is produced even when the two sides are mildly laterally offset and angularly misaligned.

If the stabbing nose 325 is lengthened to project beyond the inner end of the nut 340 and the male side 301 and its straight counterbore 303 are correspondingly lengthened, then the connector 300 can accommodate significantly larger stabbing misalignments. The longer stabbing nose 325 will induce alignment in a manner similar to the alignment means in the connector 100.

Seal 50 is identical to the seal 50 used in connector 1 as shown in an enlarged view in FIG. 13A. When installed the bore 51 of seal 50 is internally flush with the counterbores 303 and 313 of male side 301 and nut hub 311, respectively. The equally proportioned sealing faces 52 of seal 50 are conical with annular grooves axially spaced on the conical surfaces. The annular wall formed between the bore 51 and a conical sealing face 52 is relatively thin, so that the seal is somewhat flexible. The conical surfaces 52 of seal 50 are made to have an elastic mild interference fit with the corresponding seat recesses 304 and 314 of male side 301 and nut hub 311, respectively, when the connector 300 is fully torqued and made up.

Central flange 53 serves as a stop to prevent excessive, permanent distortion of the conical sealing surfaces 52 from overcompression in the seat recesses 304 and 314. Multiple screw holes 54 in flange 53 comate with holes 316 in the nut hub to permit attachment of seal 50 to the nut hub 311 with flathead screws 55 engaged in the drilled and tapped holes 316 of the nut hub 311. When seal 50 is fully screwed down on the mating face of transverse inner shoulder 315 of nut hub 311, sealing engagement occurs between conical seal recess 314 of nut hub 311 and a conical sealing face 52 of seal 50. The seal 50 is substantially similar to the seal used for Graylok™ connectors or the G-Con™ connector offered by the Reflange Company, but with the addition of the multiple annular grooves in the sealing faces 52 and the mounting screw holes 54 to permit fixing the seal to the nut hub 311. Seal 50 is energized primarily by mechanical compression prestress at its interfaces, but it is additionally pressure energized by the differential across its wall.

Nut retainer 330, best seen in FIG. 20, is a short right circular cylindrical ring which has in its bore female threads 331. Threads 331 are screwed together with the outer end male thread 320 of nut hub 311 so that inner side transverse shoulder 333 abuts outwardly facing transverse shoulder 346 of annular nut 340 and thereby retains nut 340 on nut hub 311. Multiple equispaced rectangular spanner slots 332 are provided on the exterior cylindrical surface of nut retainer 330 to ease assembly. Whenever the connector 300 is disconnected, the annular nut 340 is normally spaced away from the outwardly facing transverse shoulder 318 by a distance D as shown in FIG. 23. This distance D is adjustable by the positioning of the nut retainer 330.

Annular nut 340 is mounted coaxially on the nut hub 311 with its guide bore section 345 having a slip fit on the nut support cylindrical surface 319 of the nut hub. The nut 340 is able to reciprocate between the outwardly facing transverse shoulder 318 of the nut hub 311 and the inner transverse shoulder 333 of the nut retainer 330. Annular nut 340 has, starting at its inner interior end at the left side of the female side 310 in FIGS. 23 and 24, multistart interrupted internal threads 341 comateable with the male threads 307 of male side 301, undercut enlarged bore section 343, an inwardly facing interior transverse shoulder 344, and a reduced diameter guide bore section 345.

The internal interrupted threads 341 are in three equispaced equal arc segments having arc lengths of 57° to 59°. The positioning of the internal threads 341 is such that, when the male 301 and female 310 sides are stabbed together, the external interrupted threads 307 do not interfere with the internal interrupted threads 341. Guide bore section 345 closely fits to the nut support cylindrical surface 319 of nut hub 311. Outwardly facing transverse shoulder 346 connects the guide bore section 345 with the external cylindrical face 347 of the nut 340. The external cylindrical face 347 is provided with an external snap groove 348 located a short distance inward from the outwardly facing transverse shoulder 346, with another snap ring groove 348 located similarly at the opposed end of the nut 340. The intersections of the snap ring grooves 348 with the external cylindrical face 347 are chamfered to permit the passage of O-rings 372 and 377 without damage. Multiple spanner pin holes 349 are equispaced in a hole circle with their axes parallel to but equally offset from the longitudinal axis of nut 340. The nut 340 can be torqued by means of the spanner holes 349, or alternatively it can be provided with a torquing system 60 of the sort used for the connector 1 or the connector 200.

A relatively large radius is provided at the intersection of undercut bore section 343 and the interior transverse shoulder 344 for stress reduction. Also multiple flat bottom holes serving as spring pockets 350 are spaced in a hole circle with their axes parallel to but equally offset from the longitudinal axis of nut 340. The arrangement of the spring pockets 350 is such that they are geometrically balanced about the longitudinal axis of the annular nut 340 whenever identical springs 354 are installed in the pockets 350 to produce an axial bias force. A nut bias spring 354 is housed in each of the spring pockets 350 so that a first end of each spring abuts the bottom of the spring pocket 350 and the second end of each spring abuts the outwardly facing transverse shoulder 318 of the nut hub 311. The nut bias springs can be fully compressed so that they are completely recessed within their spring pockets 350 without overstress.

Alternatively, a single coil spring or wave spring may be interposed coaxial with the nut hub 311 between the interior transverse shoulder 344 of the nut 340 and the outwardly facing transverse shoulder 318 of the nut hub 311. This can be done by providing a counterbore in the guide bore 345 opening toward the threaded end of the nut to house the single spring. Sufficient contact area between the shoulders 344 and 318 must still be provided to avoid overstress during final tightening of the connector.

When the springs 354 or a single spring and the nut 340 are in their normal, unengaged position, the springs collectively exert sufficient force to ensure that the nut is strongly biased against the inner transverse shoulder 333 of the nut retainer for any orientation of the female side 310 of the connector 300. At such a time, the axial separation of the outwardly facing transverse shoulder 318 of the nut hub 311 from the inwardly facing interior transverse shoulder 344 of the nut 340 is distance D, as shown in FIG. 23. After the connector 300 is fully made up between the male side 301 and the female side 310, the inwardly facing interior transverse shoulder 344 of the nut 340 and the outwardly facing transverse shoulder 318 of the nut hub are in preloaded contact, as shown in FIG. 24. At such a time, the axial separation between the outwardly facing transverse shoulder 346 of the nut 340 and the inner transverse shoulder 333 of the nut retainer 330 is distance D, as shown in FIG. 24.

Figure 21:
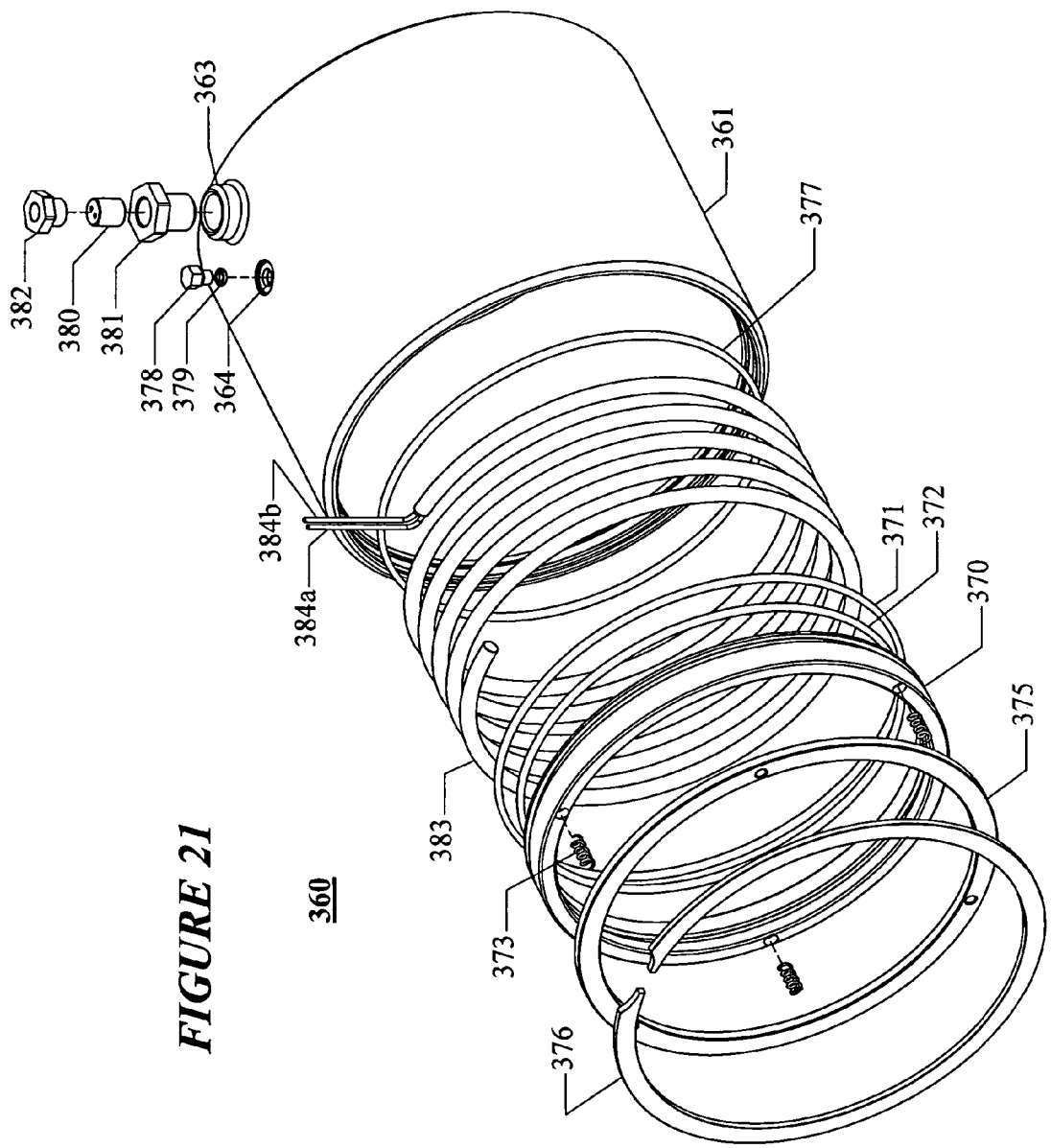
FIG. 21 is an exploded view of the heater sleeve of the connector of FIG. 19.

FIGS. 21, 23, and 24 show, respectively, an exploded view and two longitudinal sectional views of the heater sleeve 360 used on connector 300. Heater sleeve 360 is mounted concentrically on the exterior of the nut 340 for electrically applying heat to the portion of the nut adjacent the undercut bore section 343. Heater sleeve 360 is closely fitted to the external cylindrical surface 347 of nut 340 and is retained there by means of male snap rings 355 adjacent the distal ends of the heater sleeve when the snap rings are engaged in the snap ring grooves 348.

The primary components of the heater sleeve 360 are the outer sleeve 361, the balance piston 370, and the heating element 383. The purpose of heater sleeve 360 is to house the heating element 383 in a pressure-balanced oil-filled environment both for protection from external effects and for improving the heat transfer to the exterior of the nut from the heating element.

The outer sleeve 361, which serves as a housing for the heating element 383, is a relatively thin walled right circular cylindrical sleeve with an inwardly extending outer end diaphragm 362 at its outer end and a radially extending tubular wire entry boss 363 located adjacent the diaphragm on its inward side. The bore of the outer sleeve 361 has a female O-ring groove centrally located on the interior cylindrical face of the diaphragm 362 and mounting O-ring 377, a first interior transverse shoulder, a larger diameter extended inner cylindrical wall, a second interior end transverse shoulder 365, a short and slightly larger counterbored cylindrical section, and a female snap ring groove 366 adjacent the inward end of the outer sleeve. The wire entry boss 363 is provided with an internal thread that is engageable by the male threads on the exterior of seal plug carrier nut 381. Additionally, the cylindrical wall of the outer sleeve is penetrated by a drilled and tapped straight-thread O-ring fill port 364 for admitting oil fill into the annulus between the nut 340 and the interior of the heater sleeve 361. Straight-thread O-ring fill hole plug 378 with associated fill hole plug O-ring 379 are used to seal fill port 364.

Balance piston 370 is a short right circular cylindrical ring with a male O-ring groove mounting male O-ring 371 on its exterior cylindrical face, and a female O-ring groove mounting female O-ring 372 on its interior cylindrical face. The male O-ring 371 seals between the balance piston 370 and the extended inner cylindrical wall of the outer sleeve 361, and the female O-ring 372 seals between the balance piston and the external cylindrical face of the nut 340. Balance piston 370 also has multiple equispaced shallow flat bottom holes in a hole circle in its inwardly or leftward facing transverse face engaging the first end of a corresponding number of balance piston bias springs 373. The second end of the balance piston bias springs 373 bears against the outward or right hand side of the short right circular cylindrical end ring 375. End ring 375 has a sliding fit in the counterbore between the interior end transverse shoulder 365 and the female snap ring groove 366 of the outer sleeve 361. The end ring 375 has a loose slip fit at its bore with the external cylindrical face 347 of the nut 340, so that fluid communication is permitted in either direction past the end ring. End ring 375 is retained in position within the outer sleeve 361 by a female snap ring 376 engaged in the snap ring groove 366 of the outer sleeve.

The seal plug carrier nut 381 is a hollow screw with an external hex head and an internal transverse lip at the interior end of its bore. The seal plug carrier nut 381 has an internally threaded bore that is a close fit to the exterior of rubber seal plug 380 and which has a female thread. The external thread of carrier nut 381 is sealingly engaged with the interior thread of the wire entry boss 363 of the outer sleeve 361. Rubber seal plug 380 is inserted into the bore of the seal plug carrier nut 381 until it bottoms on the internal lip of the carrier nut 381.

The heating element lead wires 384a,b of the heating element 383 are passed through closely fitting through holes in right circular cylindrical seal plug 380. The through holes are parallel and lateral to multiple spanner pin holes 349. The spanner pin holes 349 are equispaced in a hole circle with their axes parallel to but offset from the longitudinal axis of nut 340 and offset from the longitudinal axis of seal plug 380. When hollow hex head externally threaded packer nut 382 is threadedly engaged with the internal threads of carrier nut 381, rubber seal plug 380 is compressed so that it seals between the wires 384a,b and the carrier nut 381.

The lead wires 384a,b are passed through the bore of the packer nut 382 and selectively connected to an external electric power source, not shown herein, for applying heat to the nut 340. The heating element 383 is a metallic tubular helical coil with parallel internal heating element conductors surrounded by electrically insulative mineral fill inside the coil. The heating element conductors are each joined to a separate heating element lead wire at a first end and to each other at a second end so that a circuit can be formed. The heating element 383 is positioned in the annulus between the outer sleeve 361 extended bore and the external cylindrical face 347 of the nut 340. The remaining volume in the annulus is then partially filled through fill port 364 with an appropriate heat transfer fluid to ensure that heat is transferred efficiently from the heating element 383 to the annular nut 340. The outside of the heater sleeve 360 and the undercut bore section 343 of the nut 340 can be insulated to reduce extraneous heat losses if desired, although that configuration is not shown herein. If the volume of the heat transfer fluid is reduced or expands due to compressibility, leakage, or thermal effects, balance piston 370 can shift axially to compensate for the volume change without losing isolation of the heating element 383.

The connector 300 of the present invention, shown in FIGS. 19-24, is operated in the following manner. FIG. 19 shows the male side 301 and the female side 310 of the connector 300 positioned to initiate stabbing. It is assumed that the male side 301 is held fixed, while the female side 310 is only constrained against rotation about its longitudinal axis. Rotational means, such as the torquing system 60 used on the first connector1 or a torquing means engagable with the spanner pin holes 349, can be utilized. Hollow spindle hydraulic motors or other types of drives are commonly available and applicable for rotating the nut 340 relative to the nut hub 311 in order to make up the connector 300.

For simplicity, no pipe attachments are shown for the connector 300, but such attachments are understood as applicable for this embodiment. The construction of connector 300 is such that it can be stabbed in cases when the connector halves are somewhat misaligned as a result of axial offset and inclination of the stabbing longitudinal axes relative to each other. The stabbing of connector 300 is sequentially shown in FIGS. 19, 23, and 24. These drawings show the male side 301 and the female side 310 as being concentric during stabbing and make up. Alternatively, the stabbing nose 325 of the female side 310 can interact with the straight counterbore 303 and the conical seal recess 304 of the male side 301 to compel axial alignment of the connector 300 in approximately the same manner that the connector 100 is aligned by its stabbing nose 138.

When the stabbing nose 325 is extended outwardly beyond nut 340 and corresponding adjustments are made to male side 301 and the counterbore 303, then the tolerable amount of axial transverse offset between the halves of the connector 300 is equal to one-half of the difference between the larger conical entry diameter of the seal recess 304 and the outer diameter of the stabbing nose 325. The angular stabbing misalignment tolerable for connector 300 is approximately the angle of the conical taper of the seal recess 304 of male side 301.

Stabbing alignment is induced initially by the lateral reactions between stabbing nose 325 and the seal recess 304 reducing lateral axis offset. Final alignment is caused by opposed transverse reactions on the stabbing nose 325 from the straight counterbore 303 inducing both angular and translational alignment of the male side 301 and the female side 310 of the connector 300.

Figure 22:
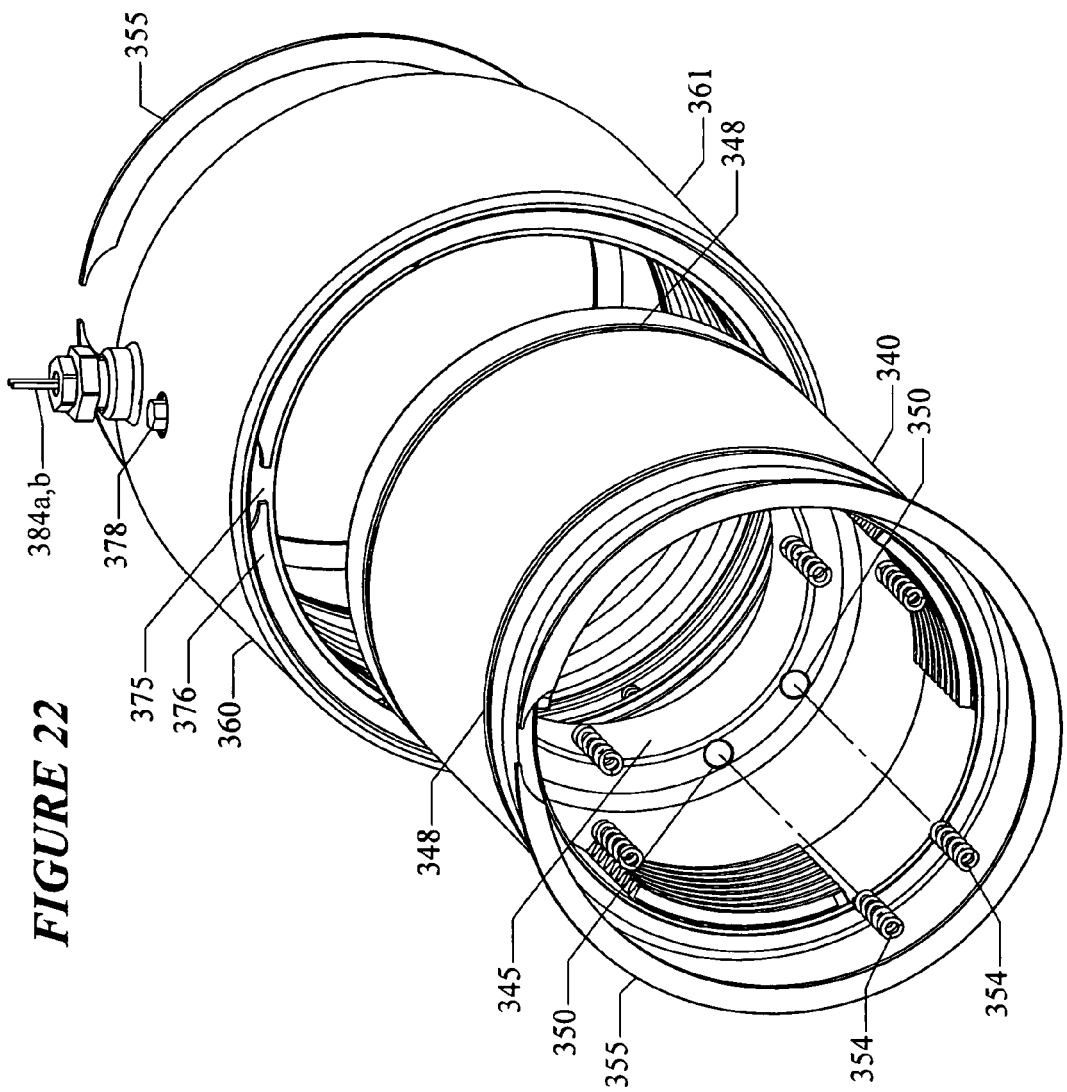
FIG. 22 is an exploded view of the female side of the connector including the stabbing hub and the heater sleeve with biasing springs positioned therebetween.

Referring to FIGS. 22 and 23, the biasing springs 354 can be seen. The springs 354 are located in the spring pockets 350 and bear against the bottom of the spring pockets in the nut 340 on their first ends and against the outwardly facing transverse shoulder 318 of the nut hub 311 on their second ends. The springs 354 are sized to hold the threadedly unengaged nut at a predetermined axial spacing D away from shouldering with the nut. The distance D is equal to the number of turns of rotation desired for making up the connection divided by the thread pitch of the threads 307 and 341. Thus, for example, if the thread pitch is 2/3 turns per inch and the connection is to be rotated 60 degrees to achieve initial make up, then D=0.25 inch.

During stabbing as shown in FIGS. 19 and 23, the nut 340 is maintained in a rotational position relative to the male side 301 so that the interrupted male threads 307 of the male side and the interrupted female threads 341 of the nut can pass by each other without interference. When the transverse interior end 305 of the male side 301 abuts the exposed side of the flange 53 of the seal 50 mounted on the nut hub 311 of the female side 310, the male threads 307 and the female threads 341 are positioned so that rotation of the nut 340 in a direction to tighten the thread will initiate thread make up. While the threads are being tightened by additional rotation, nut 340 is advanced toward male side 301 and the distance between the interior transverse shoulder 344 of the nut and the outwardly facing transverse shoulder 318 of the nut hub 311 is reduced.

Completion of the stabbing operation is shown in FIG. 24, when seal 50 is fully seated in conical seal recess 304 of male side 301. At this point the nut 340 is torqued to its initial pretension by applying torque to the nut by some suitable drive means. This level of pretension is sufficient to keep the seal 50 fully engaged in conical seal recess 304, but the threaded connector 300 at this point is insufficiently preloaded either to avoid fatigue of the threaded portion of the connection or to transfer high bending moments across the connection.

Accordingly, after the nut 340 is initially pretensioned, electric power is applied to the heating element 383 of the heater sleeve 360 via heater feed wires 384a,b. Using the same methods as for the first embodiment of this invention, the nut 340 is caused to thermally expand by an amount corresponding to a desired preload strain, the nut is retorqued, power is removed from the heater sleeve 360, and then the nut is cooled. At this point, the connection is fully prestressed so that large bending moments can be carried and the threaded portion of the connection will not be fatigue sensitive. Reheating the nut 340 to the prior temperature setting or to a somewhat higher temperature and then unscrewing the nut and unstabbing the connector can disconnect connector 300.

ADVANTAGES OF THE INVENTION

The method and apparatus of this invention permit remotely making structurally strong and robust pressure containing tubular connections. In particular, the connections can be made without relying on the very large make up and break out torques required by other types of connections. The connection devices shown are configured to be remotely mated with different degrees of stabbing misalignment and environmental cleanliness. The third embodiment is for very minor misalignment and relatively clean conditions, the first embodiment for a medium level of misalignment and dirty conditions, while the second embodiment is configured to deal with substantial misalignments and dirty conditions. The fourth embodiment 300 as shown in FIGS. 19-24 is able to handle only minor misalignments, but lengthening stabbing nose 325 permits it to overcome substantial misalignments. Each of the embodiments is configured to be useable with very reliable metal-to-metal sealing. For each embodiment, additional reliability is easy to provide by means of adding a redundant metal-to-metal or elastomeric face seal on the transverse mating faces. If desired, the stabbing nose of the second embodiment can be provided with a seal for circumferential sealing in an annular groove.

The pretensioning reliability of the connectors of this invention substantially surpasses that provided by traditional torquing procedures such as the "turn-of-nut" or torque wrenches. Conventional methods are dependent upon accurate knowledge of the nut-to-hub friction, but this information cannot be reliably known, due to variations in surface finish and wear and lubrication. For the case of large connections which are commonly used for tubular joints, hydraulic procedures comparable to stud tensioning would be very expensive, heavy, and unreliable over time due to elastomeric seal deterioration. The tensioning method described herein offers improved reliability with a physically compact device. Furthermore, the make up and break out procedures are insensitive to environmental conditions and exceptionally simple to control remotely. In addition, the operational procedures, including heating, can be performed rapidly even in water.

The use of the spring biased nut of the fourth embodiment greatly eased the make up of the connection, since no sensitive relative axial adjustments are required to initially engage the threads. For the fourth embodiment it is only necessary to abut the female side of the connector against the male side in order to achieve proper thread alignment.

Those skilled in the art understand that various modifications may be made to the embodiments and methods described herein without departing from the spirit of the invention. Further, various aspects of the different embodiments can, be combined without departing from the spirit of the invention. For instance, the stabbing nose of the second embodiment could also be used with the face seal of the third embodiment, or redundant seals or different types of seals could be utilized. Also, many different types of torquing means could be applied with this invention. Any of the embodiments could utilize the conventional threads of the second embodiment or the interrupted threads of the first and third embodiments.

It may also be readily understood that this means of establishing axial preload in a connection can also be used for connections which do not contain pressure merely by eliminating provisions for seals in the designs.

Having described several embodiments securing pressure-containing equipment, it is believed that other modifications, variations, and changes will be suggested to those skilled in the art in view of the description set forth above. It is therefore to be understood that all such variations, modifications, and changes are believed to fall within the scope of the invention as defined in the appended claims.

What is claimed is:

1. A tubular connector comprising:
    a first hub having an interior end, an external surface with a plurality of threads on a portion of the external surface, an exterior terminal end secured to a first tube terminal end and a first through bore having a distal counterbore and a proximal counterbore;
    a second hub having a second through bore, a first end and a second end, wherein the second end terminal end is secured to a second tube terminal end;
    a stabbing nose having a third through bore, a stabbing end and an opposed attachment end, the attachment end secured to an interior surface of the second hub proximal to the first end of the second hub;
    a coupling nut coaxially mounted on the second hub, wherein the coupling nut has a plurality of internal threads to threadedly engage the threads on the external surface of the first hub, wherein when the coupling nut is tightened the stabbing end of the stabbing nose is positioned in the distal counterbore of the first hub and the first end of the second hub is positioned in the proximal counterbore of the first hub, and wherein the first, second and third through bores are coaxially and linearly arrayed to create a fluid path from an interior of the first tube through an interior of the second tube;
    mounting means for coaxially mounting the coupling nut onto an outer surface of the second hub, the mounting means providing the coupling nut with axial positioning control;
    a selectably controllable heating means mounted on the coupling nut for heating a portion of the coupling nut; and
    a seal having a fourth through bore, wherein the seal is coaxially mounted on the first end of the second hub and is sealingly comated with the interior ends of the first hub and the second hub when the coupling nut is tightened.

2. The tubular connector of claim 1, wherein the exterior end of the first hub is rigidly secured to the first tube and the second end of the second hub is rigidly secured to the second tube and the first, second and third through bores and the first and second tubes have substantially equal internal diameters.

3. The tubular connector of claim 1 wherein the heating means mounted on the coupling nut is located between the internal threads and a distal end of the nut adjacent the mounting means.

4. The tubular connector of claim 1 further comprising an insulative covering for the heating means and the portion of the coupling nut heated by the heating means.

5. The tubular connector of claim 1 further comprising heat sensing means for accurately determining the temperature of the heated nut for implementing control of the nut temperature.

6. The tubular connector of claim 5, wherein the heat sensing means is a thermocouple, thermistor or heat-resistance device.

7. The tubular connector of claim 1, wherein the threads on the first hub and the internal threads of the coupling nut are interrupted threads.

8. The tubular connector of claim 1 wherein the heating means is an electrical resistance heater contained in a sealed sleeve mounted on a surface of the coupling nut.

9. The tubular connector of claim 1 wherein heating the coupling nut reduces the torque required to tighten the internal threads of the coupling nut to a predetermined axial pre-stress between the first and second hubs.

10. A tubular connector comprising:
(a) a first hub having a first end having an externally threaded exterior section, an opposed second end mounted to a first tube, a through bore adjacent the second end having a first internal diameter, an interior counterbore proximal the first end, and a middle counterbore positioned between the through bore and the interior counterbore, and a first conical seal counterbore located between the middle counterbore and the interior counterbore; and
(b) a second hub assembly comprising:
a second hub having an interior end, an exterior end, a through bore having a second interior diameter substantially equal to the first interior diameter of the through bore of the first hub, an outer surface having a larger diametered intermediate section between the interior end and the exterior end, a second conical seal counterbore proximal the interior end, an inner counterbore extending from the interior end toward the exterior end, a second tube mounted to the terminal end of the exterior end;
a stabbing nose having a through bore having a third interior diameter substantially equal to the first interior diameter of the first hub, a stabbing end and an opposed attachment end, the attachment end secured to an interior surface of the second hub within the inner counterbore;
a coupling nut coaxially mounted on the second hub, the coupling nut has an internally threaded proximal end to threadedly engage the externally threaded exterior section of the first hub, and an internal shoulder distal to the threaded proximal end, wherein the shoulder interacts with the intermediate section of the second hub;
a retaining device coaxially mounted on the outer surface of the exterior end of the second hub, wherein the retaining device limits axial movement of the internal shoulder of the coupling nut between the retaining device and the intermediate section of the second hub;
a seal coaxially mounted in the second conical seal bore of the second hub and is comateable with the first conical seal bore; and
a heating element coaxially mounted to the coupling nut, wherein when the threads of the first hub are engaged with the threads of the coupling nut and the heating element increases the temperature of the coupling nut, the coupling nut is expanded and less torque is needed to tighten the coupling nut onto the first hub such that the tubular connector has a predetermined axial pre-stress when cooled, thereby creating a sealed fluid path through the first tube the through bore of the first hub, the through bore of the stabbing nose, the through bore of the second hub, and the second tube.

11. The tubular connector of claim 10 wherein the threads on the first hub and the internal threads of the coupling nut are interrupted threads.

12. The tubular connector of claim 10, wherein the heating element selectably heats a portion of the coupling nut between the proximal end and the internal shoulder of the coupling nut.

13. The tubular connector of claim 12, further comprising a temperature control means for regulating the temperature of the heated portion of the coupling nut.

14. The tubular connector of claim 10 further comprising heat sensing means for accurately determining the temperature of the heated nut for implementing control of the nut temperature.

15. The tubular connector of claim 10, wherein the threads on the first hub and the internal threads of the coupling nut are interrupted threads having an equal number of thread interrupts and thread starts with the arc length of the thread interrupts at least as long as the arc length of the threads.

16. The tubular connector of claim 10, wherein the first interior diameter of the first hub is substantially equal to an interior diameter of the first tube and an interior diameter of the second tube.

17. A tubular connector comprising:
(a) a first hub having a first end with an externally threaded exterior section, a second end terminal end connected to a first tube terminal end, a through bore adjacent the second end having a first internal diameter substantially equal to the internal diameter of the first tube, an interior counterbore proximal the first end, a middle counterbore positioned between the through bore and the interior counterbore, and a first conical seal counterbore located between the middle counterbore and the interior counterbore; and
(b) a second hub assembly comprising:
a second hub having an interior end, an exterior end, a through bore having a second interior diameter substantially equal to the first interior diameter of the through bore of the first hub, an outer surface having a larger diametered intermediate section positioned between the interior end and the exterior end, an interior end having a second conical recess seal counterbore proximal the interior end, an inner counterbore extending from the interior end toward the exterior end, and a second tube terminal end connected on the exterior end terminal end, wherein the interior diameter of the second tube is substantially equal to the second interior diameter;
a cylindrical stabbing nose having a through bore having a third interior diameter substantially equal to the first interior diameter, a stabbing end and an opposed attachment end, the attachment end coaxially mounted in the inner counterbore of the second hub;
a coupling nut coaxially mounted on the second hub, wherein the coupling nut has a plurality of internal threads on a proximal end, the nut threads are to threadedly engage the threads on the external surface of the first hub, and an internal flange on a distal end of the coupling nut, wherein the flange is proximal to the distal side of the intermediate section of the second hub;
a retaining device coaxially mounted on the outer surface of the exterior end of the second hub proximal to the coupling nut to limit axial movement of the internal flange of the coupling nut between the retaining device and the intermediate section of the second hub;
an annular seal coaxially mounted in the second conical seal bore of the second hub and sealingly comated with the first conical seal counterbore of the first hub and the second conical seal counterbore of the second hub when the threads of the coupling nut engage the threads of the first hub to compress the seal between the interior end of the first hub and the first end of the second hub; and a heating means for heating the coupling nut coaxially mounted on an external surface of the coupling nut intermediate between the proximal and the distal ends of the coupling nut;

whereby when the first hub and the second hub assembly of the connector are progressively assembled the interaction of the counterbores of the first hub with the stabbing nose and the interior end of the second hub causes axial alignment of the connector and wherein subsequent tightening of the coupling nut onto the threads of the first hub creates a sealed fluid path through the first tube, the through bore of the first hub, the through bore of the stabbing nose, the through bore of the second hub, and the second tube.

18. The tubular connector of claim 17 wherein the progressive insertion of the stabbing end of the stabbing nose into the interior counterbore of the first hub axially aligns the first hub and the second hub assembly.

19. The tubular connector of claim 17 wherein the progressive insertion of the stabbing end of the stabbing nose into the interior counterbores of the first hub corrects an initial lateral axial offset of the first hub and the second hub assembly.

20. The tubular connector of claim 17 wherein the progressive insertion of the stabbing end of the stabbing nose into the interior counterbores of the first hub corrects an initial angular offset of the axes of the first hub and the second hub assembly.

21. The tubular connector of claim 17, wherein the threads on the first hub and the internal threads of the coupling nut are interrupted threads having an equal number of thread interrupts and thread starts with the arc length of the thread interrupts at least as long as the arc length of the threads.

22. The tubular connector of claim 17, wherein the heating means heats a portion of the coupling nut located between the internal threads and the flange of the coupling nut.

23. The tubular connector of claim 17 further comprising heat sensing means for accurately determining the temperature of the heated nut for implementing control of the nut temperature.

24. A tubular connector comprising:
a first hub having a transverse interior end, an external surface with a plurality of threads on a portion of the external surface, an exterior end, an interior coaxial passage through a center of the first hub having in sequence from the exterior end a through bore having a first diameter, a transition shoulder, a distal cylindrical counterbore, a first conical seal counterbore diverging towards the interior end, an intermediate conical counterbore diverging towards the interior end, and a proximal cylindrical counterbore, wherein an inner diameter of the proximal counterbore is larger than an inner diameter of the distal counterbore;

a second hub having a transverse interior end and an exterior end, a through bore having a second diameter substantially equal to the first diameter, an inner counterbore opening toward the interior end, a second conical seal counterbore on the interior end, and an outer surface having in sequence from the interior end a proximal section, a larger diametered intermediate section having a shoulder facing the exterior end and a distal section;

a cylindrical stabbing nose having a through bore, a stabbing end and an opposed attachment end, the attachment end mounted in the proximal counterbore of the second hub, wherein the stabbing end extends past the first end of the second hub, and wherein the stabbing nose through bore has substantially the same diameter as the second diameter;

a coupling nut coaxially mounted on the second hub, wherein the coupling nut has at a first end a plurality of internal threads to threadedly engage the threads on the external surface of the first hub and having an inwardly extending transverse flange at a second end engaged about the distal section of the second hub;

a coupling nut retention device coaxially mounted on the distal section of the second hub adjacent to the coupling nut to limit axial movement of the inwardly extending transverse flange of the coupling nut between the intermediate section of the second hub and the retention device;

a heating device coaxially mounted on a portion of the outer surface of the coupling nut between the first end and the second end of the coupling nut, wherein activating the heater elongates the coupling nut and lessens the torque required to loosen or tighten the threads of the coupling nut onto the threads of the first hub to a predetermined axial prestress;

an annular seal coaxially mounted on the transverse interior end of the second hub, wherein the seal prevents ingress or egress of fluid between the interior end of the first hub and the first end of the second hub when the seal is sealingly compressed into the first and second conical seal counterbores to form a sealed coaxially and linearly aligned fluid path that passes through the through bores of the first hub, the stabbing nose and the second hub.

25. The tubular connector of claim 24 wherein the heating device is in intimate contact with the outer surface of the coupling nut and an exterior surface of the heating device is insulated.

26. The tubular connector of claim 24, wherein the threads on the first hub and the internal threads of the coupling nut are interrupted threads having an equal number of thread interrupts and thread starts with the arc length of the thread interrupts at least as long as the arc length of the threads.

27. The tubular connector of claim 24 wherein tightening the threads of the coupling nut onto the threads of the first hub when the coupling nut has been heated by the heating device to a predetermined torque pretensions the tubular connector to a predetermined axial pretension when the heating device is inactivated and the tubular connector cooled to an ambient temperature.

* * * * *